(12) United States Patent
Edin et al.

(10) Patent No.: US 11,040,570 B2
(45) Date of Patent: Jun. 22, 2021

(54) DISC WHEEL WITH INTERNAL BRACING

(71) Applicant: Hed Cycling Products, Inc., Roseville, MN (US)

(72) Inventors: Christopher Andrew Edin, Mahtomedi, MN (US); Gregory Paul Alexander, Woodbury, MN (US); Michael Cloutier, Roseville, MN (US)

(73) Assignee: HED CYCLING PRODUCTS, INC., Roseville, MN (US)

(*) Notice: Subject to any disclaimer, the term of this patent is extended or adjusted under 35 U.S.C. 154(b) by 444 days.

(21) Appl. No.: 15/981,613

(22) Filed: May 16, 2018

(65) Prior Publication Data

US 2018/0333983 A1    Nov. 22, 2018

Related U.S. Application Data

(60) Provisional application No. 62/507,038, filed on May 16, 2017.

(51) Int. Cl.
| | |
|---|---|
| *B60B 3/08* | (2006.01) |
| *B60B 3/12* | (2006.01) |
| *B60B 3/00* | (2006.01) |
| *B60B 3/14* | (2006.01) |
| B60B 23/00 | (2006.01) |
| B60B 1/00 | (2006.01) |
| B60B 5/02 | (2006.01) |

(52) U.S. Cl.
CPC ............... *B60B 3/12* (2013.01); *B60B 3/002* (2013.01); *B60B 3/007* (2013.01); *B60B 3/08* (2013.01); *B60B 3/082* (2013.01); *B60B 3/14* (2013.01); *B60B 1/003* (2013.01); *B60B 3/085* (2013.01); *B60B 3/087* (2013.01); *B60B 5/02* (2013.01); *B60B 23/00* (2013.01); *B60B 2310/204* (2013.01); *B60B 2310/318* (2013.01); *B60B 2360/3416* (2013.01); *B60B 2900/111* (2013.01); *B60B 2900/1216* (2013.01); *B60B 2900/311* (2013.01); *B60Y 2200/13* (2013.01)

(58) Field of Classification Search
CPC .... B60B 3/08; B60B 3/12; B60B 3/14; B60B 3/002; B60B 3/082; B60B 3/007
See application file for complete search history.

(56) References Cited

U.S. PATENT DOCUMENTS 1,393,795 A * 10/1921 Lachman .................. B60B 3/08
301/64.303
2,105,317 A * 1/1938 Frank ........................ B60B 3/08
301/6.2
2,998,282 A * 8/1961 Moyer ...................... B60B 3/10
301/6.1

(Continued)

*Primary Examiner* — Scott A Browne
(74) *Attorney, Agent, or Firm* — Sprinkle IP Law Group

(57) ABSTRACT

A bicycle disc wheel comprises a first disc panel and a second disc panel. The first disc panel has a first side outer surface and a first side inner surface and the second disc panel has a second side outer surface and a second side inner surface. The first side outer surface radially extends from a first disc panel outer perimeter to a center opening and the second side outer surface radially extends from a second disc panel outer perimeter to the center opening. The second side inner surface faces the first side inner surface. A brace is coupled to the first side inner surface and the second side inner surface that provide radial and axial structural support to the disc panels.

19 Claims, 16 Drawing Sheets

(56) References Cited

U.S. PATENT DOCUMENTS

| | | | | |
|---|---|---|---|---|
| 3,446,536 | A | * | 5/1969 | Sutowski ................ B60B 37/10 |
| | | | | 301/1 |
| 3,847,444 | A | * | 11/1974 | Aker ...................... B62D 55/14 |
| | | | | 301/64.302 |
| 4,095,846 | A | * | 6/1978 | Agins ....................... B60B 5/02 |
| | | | | 152/323 |
| 4,863,207 | A | * | 9/1989 | Wackerle ............ B60B 17/0017 |
| | | | | 295/21 |
| 5,533,793 | A | * | 7/1996 | Walker .................... B60B 3/002 |
| | | | | 152/453 |
| 7,114,785 | B2 | | 10/2006 | Ording et al. |
| 2014/0191525 | A1 | * | 7/2014 | Ruebusch ........... B60B 17/0003 |
| | | | | 295/30 |
| 2017/0225511 | A1 | * | 8/2017 | Barrett .................... B60B 3/002 |
| 2017/0267021 | A1 | * | 9/2017 | Meggiolan ................ B60B 3/10 |
| 2019/0283498 | A1 | * | 9/2019 | Bodill ..................... B60B 3/002 |

* cited by examiner

DISC WHEEL WITH INTERNAL BRACING

RELATED APPLICATIONS

This application claims priority to U.S. Provisional Patent Application No. 62/507,038, entitled "Ribbed Track Disk," filed May 16, 2017, which is hereby fully incorporated by reference herein in its entirety.

TECHNICAL FIELD

This disclosure relates generally to a bicycle disc wheel with internal braces and a method of manufacturing a bicycle disc wheel with internal braces.

BACKGROUND

Rim-and-spoke type wheels are the most commonly used wheels on recreational and racing bicycles. A rim-and-spoke wheel has an outer rim to which the bicycle tire mounts and a set of spaced spokes that extend from the outer rim to a center hub shell. Typically, air can easily flow through exposed open spaces between the spokes when the wheel is ridden. The flow of air over and around the spokes in these spaces is a significant source of drag.

Unlike a conventional rim-and-spoke wheel, a disc wheel has side surfaces that are disc-shaped and have no significant open spaces. Disc wheels do not experience the same drag as rim-and-spoke wheels, but they are often less maneuverable and more difficult to control in crosswinds. Disc wheels are thus primarily used for in-door track events and shorter sprint events.

One common method of forming a disc wheel is to attach side panels to a conventional rim-and-spoke wheel to attach panels that can act as a fairing to cover the open spaces between the spokes. The spokes still provide the primary structural support to the rim and, for the drive wheel, transfer the rider's power from the hub to the rim. The rim-and-spoke wheel is rideable without the fairing. Conversely, the fairing does not form a rideable wheel in the absence of the rim-and-spoke wheel.

Other methods of making disc wheels have also been developed that do not rely on an existing rim-and-spoke wheel. One such method involves curing carbon fiber composite material over a honeycomb type core material formed of another composite. The honeycomb core aids in manufacture of the wheel and provides structural support to the carbon fiber. However, manufacturing wheels according to this method is difficult. To create a bond of adequate strength between the carbon fiber and honeycomb core, a sufficient amount of thermoset material must flow into the honeycomb core during molding. Achieving an adequate bond is difficult when using pre-impregnated carbon fiber because the resin in the carbon fiber is already partially cured and cannot easily flow into the honeycomb core. On the other hand, it is difficult to do a "hand layup" of carbon fiber—that is a layup without using a pre-preg carbon fiber—in complex shapes. Consequently, disc wheels formed over a honeycomb core often have flat sides, which may not provide optimum aerodynamics for the wheel.

According to another method, disc wheel panels can be formed by molding carbon fiber composite material around a structural foam core to form panels that have a sandwich construction. The panels can then be joined together to form a disc wheel. The structural foam layer in the panels provides additional structural support to the carbon composite. The strength of carbon composite materials typically increases, up to a certain point, as the pressure, temperature and time used in the curing process increases. However, common structural foams used in some sandwich construction processes have a fairly low pressure tolerance. Thus, such processes typically occur at low pressures (e.g., less than 20 psi). Forming a disc wheel in this fashion unduly limits the strength of the wheel or requires longer molding times.

SUMMARY

According to one embodiment, a bicycle disc wheel comprises a first disc panel, a second disc panel and an internal brace that provides radial and axial structural support to the first disc panel and second disc panel. The first disc panel has a first side outer surface and a first side inner surface. The first side outer surface radially extends from a first disc panel outer perimeter to the center opening. The second disc panel has a second side outer surface and a second side inner surface. The second side outer surface radially extends from a second disc panel outer perimeter to the center opening. The second side inner surface is axially spaced from and facing the first side inner surface. The internal brace is coupled to the first side inner surface and the second side inner surface. According to one embodiment, the brace may comprise a rib. The brace may be molded in the first panel or the second panel.

The bicycle wheel may comprise a plurality of braces. The braces, in some embodiments, may comprise molded-in braces that are molded in the first disc panel or the second disc panel.

A brace may comprise a radially extending rib. The radially extending rib can be coupled to the first side inner surface and the second side inner surface. The radially extending rib may extend from a hub center portion to a circumferential perimeter wall of the disc wheel. In another embodiment, the radially extending rib may be spaced from the hub center portion or the perimeter wall. The radially extending rib may be molded in the first disc panel or second disc panel.

In another embodiment, a brace may comprise a circular rib. The circular rib can be coupled to the first side inner surface and the second side inner surface. The circular rib may be concentric about a center opening (e.g., a hub opening) of the disc wheel. The circular rib may be molded in the first disc panel or the second disc panel.

The second disc panel can be bonded to the first disc panel at a bonding surface. According to one embodiment, the bonding surface may be a circumferential bonding surface on the inner side of the first panel, a bonding surface on a brace, a bonding surface of a hub flange or other bonding surface.

The disc wheel can be an all composite material (e.g., carbon fiber composite) disc wheel. The disc wheel may or may not have a core.

Another embodiment comprises a method of manufacturing a bicycle disc wheel. The method includes positioning a panel material, such as a carbon fiber composite material or other composite material, on a molding surface of a mold. The method further includes arranging a set of shaped pieces and braces on an inner surface of the panel material. According to one embodiment, the braces comprise ribs. The shaped pieces can be configured to support the braces in the mold and may be formed of a flexible, expanding material. The method further includes baking the mold to cure the panel material and braces into a first disc panel with molded-in braces. The method can further include removing the set of shaped pieces from between the molded-in braces. A second disc panel can be coupled to the first disc panel to form a disc wheel with the molded-in braces.

Arranging the set of shaped pieces and braces on the inner surface of the panel material can include arranging the set of shaped pieces and braces to form a radially extending rib. In one embodiment, the radially extending rib extends radially from an internal hub center to a circumferential perimeter wall. In another embodiment, the radially extending rib is spaced from the hub center or circumferential perimeter wall. In addition or in the alternative, arranging the set of shaped pieces and braces on the inner surface of the panel material can include, in one embodiment, arranging the set of shaped pieces and braces to form a circular rib that is concentric with a central opening of the wheel.

The second disc panel can be bonded to the first disc panel at a bonding surface. In one embodiment, bonding the second disc panel to the first disc panel can include bonding an inner surface of the second disc panel to bonding surfaces of the molded-in braces. Bonding the second disc panel to the first disc panel may also include bonding the inner surface of the second disc panel to a circumferential bonding surface on an inner side of the first disc panel. Bonding the second disc panel to the first disc panel may include bonding the inner surface of the second disc panel to a hub flange of the first disc panel. Bonding the second disc panel to the first disc panel may include bonding a hub index to a hub center.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

DETAILED DESCRIPTION

The disclosure and various features and advantageous details thereof are explained more fully with reference to the exemplary, and therefore non-limiting, embodiments illustrated in the accompanying drawings and detailed in the following description. It should be understood, however, that the detailed description and the specific examples, while indicating the preferred embodiments, are given by way of illustration only and not by way of limitation. Various substitutions, modifications, additions and/or rearrangements within the spirit and/or scope of the underlying inventive concept will become apparent to those skilled in the art from this disclosure.

Embodiments described herein provide an internally braced bicycle disc wheel. Embodiments further provide a manufacturing method to make a very stiff and light bicycle disc wheel that includes internal braces (e.g., carbon fiber ribs). The internal cross bracing allows the disc panels to be lighter while keeping the stiffness and strength. According to one embodiment, a disc wheel according to the teachings herein can be an all composite material disc wheel. In this context, an "all composite material" disc wheel refers to a wheel having a wheel disc that is made entirely of a composite material from the center opening of the wheel disc to a radially outer edge of the wheel disc. For example, an "all carbon fiber" disc wheel refers to a wheel having a wheel disc that is made entirely of a carbon fiber composite from the center opening of the wheel disc to a radially outer edge of the wheel disc. Furthermore, embodiments described herein can be spokeless. A rider's power can be transferred from the hub to the outer perimeter of the wheel by the disc side panels rather than by spokes.

Figure 1:
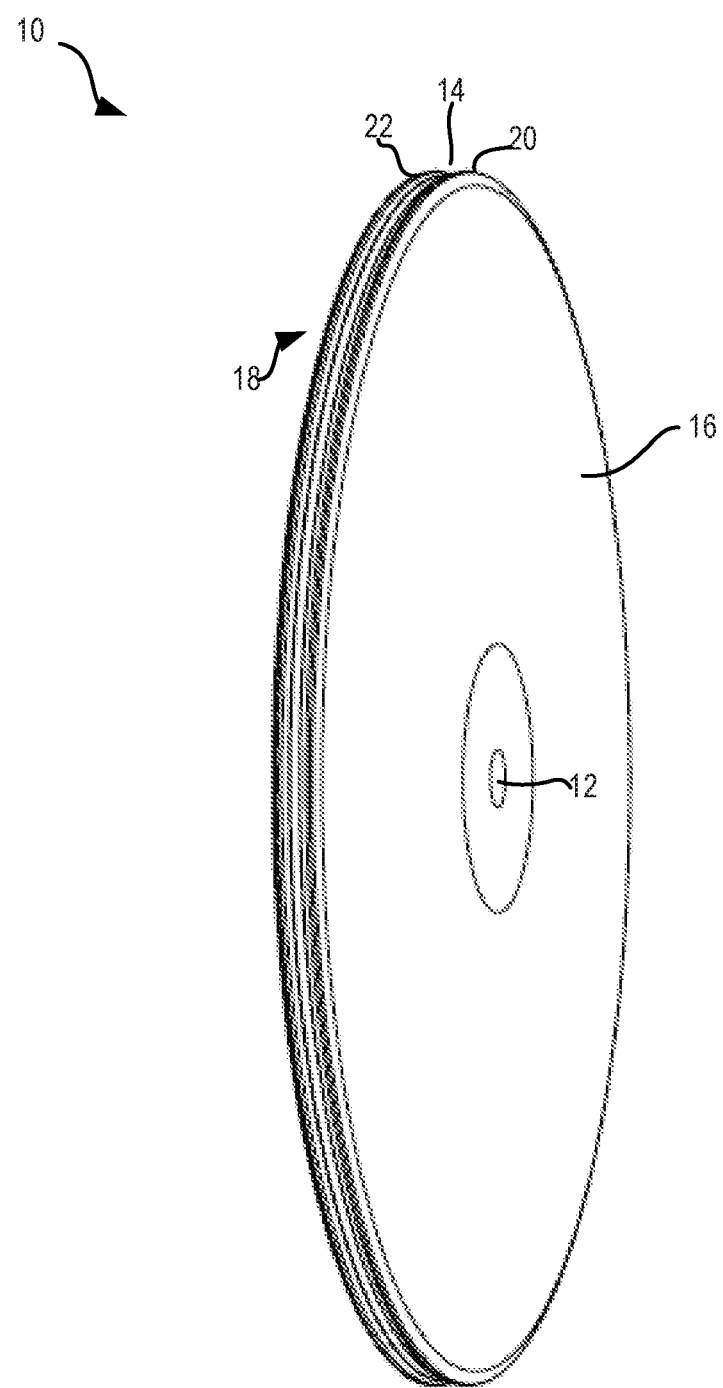
FIG. 1 is a perspective view of one embodiment of a disc wheel for a bicycle.
Figure 2:
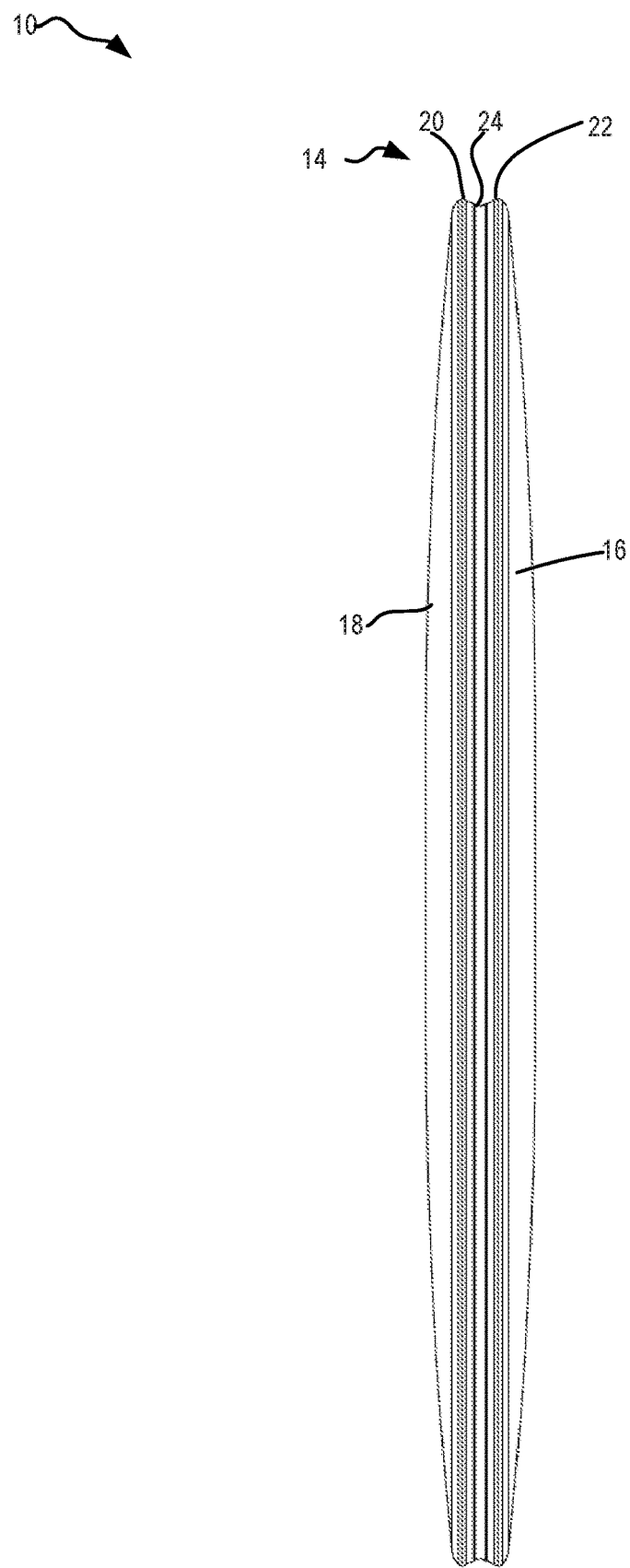
FIG. 2 is a front view of one embodiment of a disc wheel for a bicycle.

FIG. 1 and FIG. 2 are diagrammatic representations of one embodiment of a disc type bicycle wheel 10 which is generally circular or disc shaped, and includes a hub portion 12, a tire engaging portion 14 at the wheel's radial perimeter and first and second axially spaced, opposite side outer surfaces 16, 18 that radially extend from the tire engaging portion 14 to the hub portion 12. A portion of first and second side outer surfaces 16, 18 may comprise a brake engaging portion. The brake engaging portion may have a radial extent that is slightly larger than the height of a typical bicycle brake caliper.

Hub portion 12 defines a hub opening in which a hub can be installed at the wheel's radial center. The hub may include an axle portion that is rotatable independently of the remainder of the hub, and a flange portion that extends radially outward for a short distance to engage a portion of the hub portion 12 of the wheel 10. The flange portion of the hub may be coupled to wheel 10 with fasteners or other mechanisms.

The tire engaging portion 14 is configured to receive a tire that can be mounted thereto. According to one embodiment, tire engaging portion 14 is shaped to mount a clincher tire. According to another embodiment, tire engaging portion 14 is shaped to mount a non-clincher tire, such as a tubular tire that does not have tire beads. In the embodiment illustrated, tire engaging portion comprises a first circumferential lip 20, a second circumferential lip 22 and a generally concavely disposed tire facing tire bed 24 that extends in a generally axial direction between the first and second circumferential lips 20, 22, and around the wheel 10.

The first side outer surface 16 forms the majority of the first outer side of the wheel 10 extending between the hub portion 12 and the tire engaging portion 14. The second side outer surface 18 forms the majority of the second outer side of the wheel 10, which is axially opposed to the first outer side of the wheel 10, extending between the hub portion 12 and the tire engaging portion 14. First and second side surfaces 16, 18 may have a planer, convex, concave or other shape. First and second side surfaces 16, 18 can include surface features such as dimples or other features.

According to one embodiment, wheel 10 is generally symmetrical about a radially extending plane, so that the first and second side surfaces 16, 18 are generally mirror-images of each other. In other embodiments, first and second side surfaces 16, 18 may have different shapes such that wheel 10 is asymmetrical about a radially extending plane.

Wheel 10 can be formed from disc panels that are molded or assembled together to form a disc wheel with internal braces. The disc panels may have a variety of configurations, some non-limiting examples of which are discussed below in conjunction with FIGS. 3-8.

Figure 3:
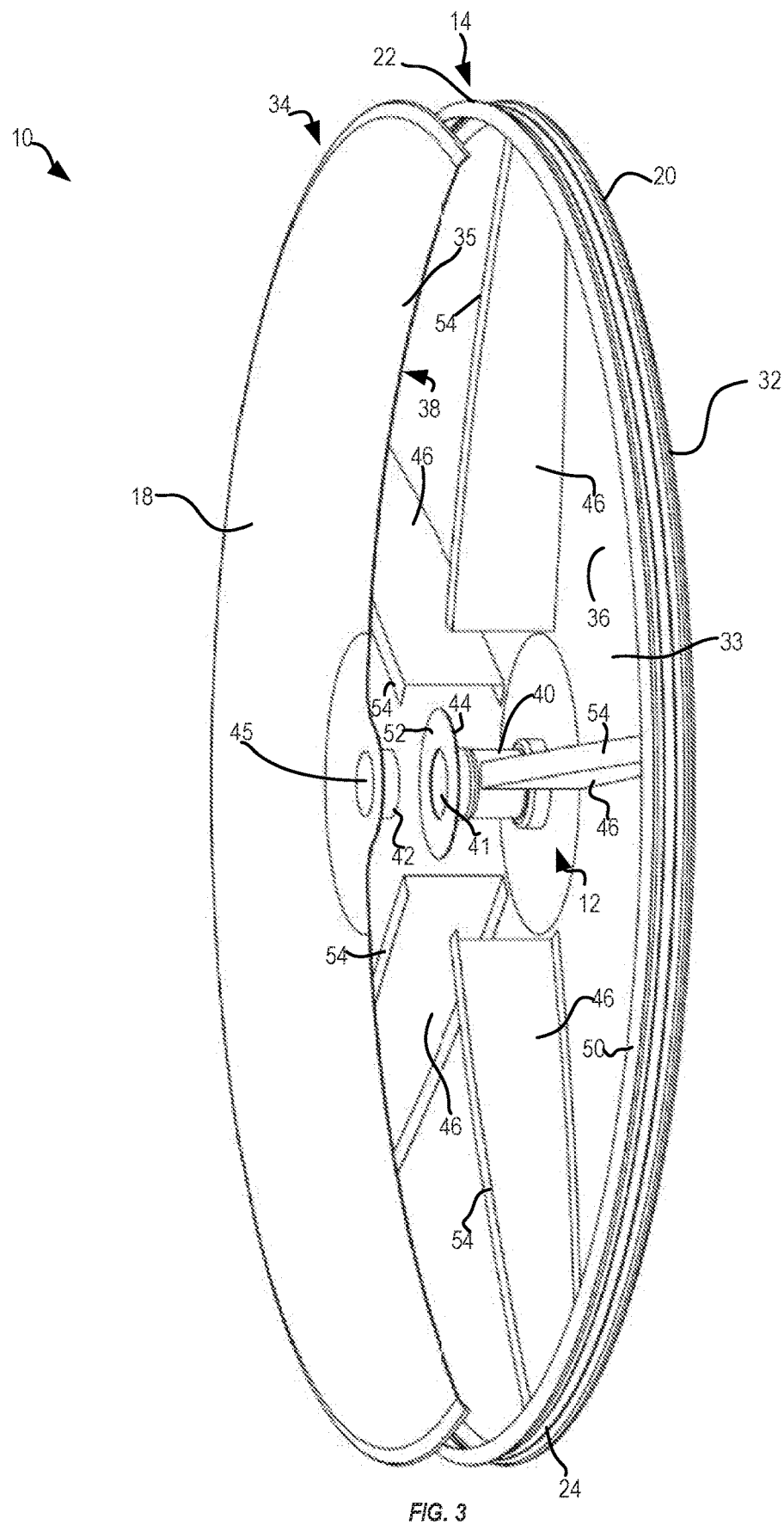
FIG. 3 is a cutaway view of one embodiment of a ribbed disc wheel.

FIG. 3 illustrates a partially exploded cut away view of one embodiment of disc wheel 10. In the illustrated embodiment, disc wheel 10 comprises a first disc panel 32 and a second disc panel 34 that can be coupled together to form a disc wheel. First disc panel 32 includes a first side panel 33 having first side outer surface 16 (FIG. 1 and FIG. 2) and first side inner surface 36. Second disc panel 34 includes a second disc side panel 35 having second side outer surface 18 and second side inner surface 38 that faces first side inner surface 36. The first side outer surface 16 extends from a radial perimeter of first disc panel 32 to hub opening 45 and second side outer surface 18 extends from the radial perimeter of first disc panel 32 to hub opening 45. First side inner surface 36 and second side inner surface 18 extend between hub portion 12 and tire engaging portion 14. According to one embodiment, first side inner surface 36 and second side inner surface 38 may have a planer, convex, concave or other shape.

Hub portion 12 includes a hub center 40, a hub index 42 and a disc panel hub flange 44. Hub portion 12 forms a hub opening 45 through wheel 10. Hub opening is shaped to receive a hub. In one embodiment, the portion of hub opening 45 formed by hub center 40 is shaped, proximate to inner surface 38, to receive hub index 42 and act as a hub index receiving area. During assembly, hub index 42 can slip inside of hub center 40 to help ensure that disc panels 32, 34 are aligned and concentric to the wheel center. In addition or in the alternative, disc panel 32 and disc panel 34 may include other alignment features to facilitate alignment of the disc panels.

A set of ribs 46 extend between first side inner surface 36 and second side inner surface 38. Ribs 46 may be molded in panel 32 or panel 34 or molded separately and bonded to panel 32 and panel 34. A first side of each rib 46 may follow the contour of first side inner surface 36 and a second side of each rib may follow the contour of second side inner surface 38. The ribs 46 are configured to provide structural support to wheel 10 both laterally (axially) and in compression (radially).

The ribs 46 may have a variety of shapes and sizes. In the embodiment of FIG. 3, the ribs each extend primarily radially from an inner radius that is spaced from hub center 40 to the radially inner side of tire engaging portion 14. In other embodiments, the radially inner ends of ribs 46 may terminate at hub center 40. Moreover, the radially outer ends of ribs 46 may be spaced from the radially inner side of tire engaging portion 14.

According to one embodiment, first disc panel 32 is molded as a single panel that includes a circumferential wall that provides tire bed 24, circumferential outer lip 20, circumferential outer lip 22, side panel 33, hub center 40 extending axially inward from side panel 33, hub flange 44 extending radially outward from hub center 40 at the end of hub center 40 that is distal from side panel 33, and molded-in ribs 46. Second disc panel 34 is molded as a single panel that includes side panel 35 and hub index 42 that projects axially inward from side panel 35.

Disc panels 32, 34 are coupled together after molding, such as by gluing or bonding with another agent. To this end, disc panels 32, 34 may be formed with bonding surfaces so that they can be bonded together. For example, a circumferential flat bonding surface 50 to which disc panel 34 can be bonded is disposed on the inner side of disc panel 32 proximate to the radially outer edge of disc panel 32. As another example, surface 52 of hub flange 44 that faces second side inner surface 38 can provide a large bonding surface to which the opposite disc panel 34 can be bonded. Further, ribs 46 may comprise surfaces 54 that face second inner surface 38 and can be used as bonding surfaces to which the second inner surface 38 can be bonded. If panel 32 includes molded-in ribs, such ribs may have a bonding surface to which inner surface 36 can be bonded. As another example, the radially outer surface of hub index 42 may be bonded to a radially inner surface 41 of hub center 40. In addition or in the alternative, disc panel 32 and disc panel 34 may be coupled together using other mechanisms, such as with fasteners.

The foregoing example in which tire bed 24, circumferential outer lip 20, circumferential outer lip 22, side panel 33, hub center 40 extending axially inward from side panel 33, hub flange 44 extending radially outward from hub center 40 at the end of hub center 40 that is distal from side panel 33, and molded-in ribs 46 are molded as a panel is provided by way of example and not limitation. Various parts of the wheel can be formed separately and joined together. For example, in some embodiments, ribs 46 may be molded separately from disc panels 32 and 34. In such an embodiment, they can be bonded or otherwise coupled to disc panel 32 or disc panel 34 before disc panels 32, 34 are bonded together.

Figure 4:
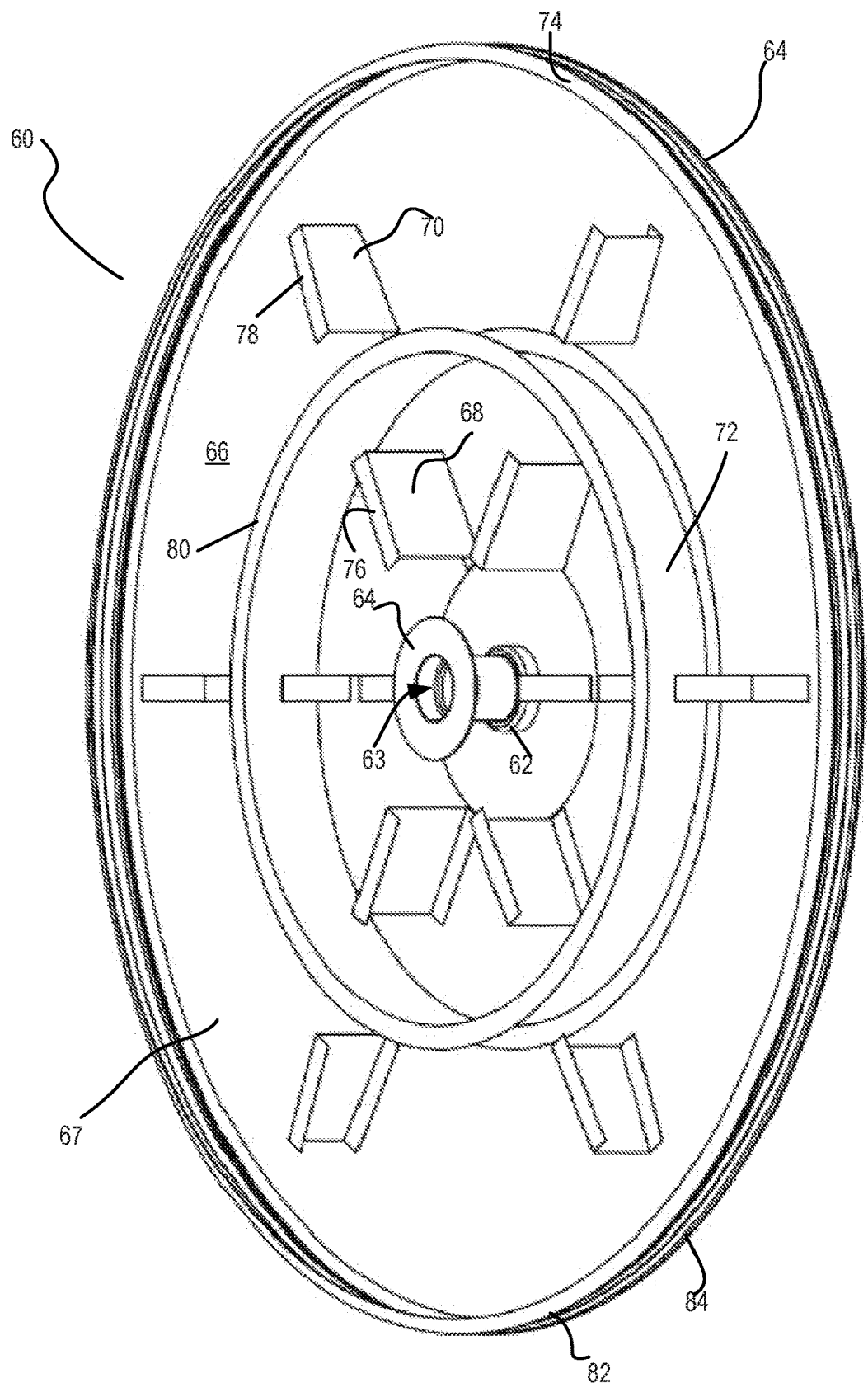
FIG. 4 is a perspective view of one embodiment of a ribbed disc panel.

FIG. 4 depicts another embodiment of a disc panel 60. Disc panel 60 can be coupled to a second disc panel, such as second disc panel 34, to form a wheel. In the embodiment illustrated, disc panel 60 includes a side panel 66 having an outer surface and inner surface 67. The outer surface may be similar to outer surface 16 discussed above and extend from an outer perimeter of disc panel 60 to the center opening (e.g., hub opening 63). The inner surface 67 extends between a hub portion and tire engaging portion 64. The outer and inner surface 67 of panel 66 can have a variety of shapes, such as planer, concave, convex or other shapes.

Disc panel 60 further comprises a hub center 62 and disc panel hub flange 64. A hub opening 63 through hub center 62 is shaped to receive a hub. The portion of hub center 62 distal from side panel 66 may be shaped to receive a hub index (e.g., hub index 42) and act as a hub index receiving area. During assembly, the hub index can slip inside of hub center 62 to help ensure that the disc panels being assembled into a wheel are concentric to the wheel center. In addition or in the alternative, disc panel 60 may include other alignment features to facilitate alignment of the disc panels.

An inner set of radially extending ribs 68 and an outer set of radially extending ribs 70 extend axially from inner surface 67. A ring-shaped rib 72 that is concentric about the center of panel 66 also extends axially from inner surface 67. Ribs 68, 70, 72 extend a sufficient distance so that they may be bonded to a facing panel. A first side of each rib 68, 70, 72 may follow the contour of inner surface 67 and a second side of each rib may be shaped to follow the contour of the inner surface of an opposite panel (e.g., side panel 35 of FIG. 3) where the ribs are to bond to the opposite panel. The ribs 68, 70, 72 are configured to provide structural support to a wheel both laterally (axially) and in compression (radially).

The ribs 68, 70, 72 may have a variety of shapes and sizes. In the embodiment of FIG. 4, the ribs 68 each extend primarily radially from an inner radius that is spaced from hub center 40 to an outer radius that is less than the radius of rib 72. In other embodiments, the radially inner ends of ribs 68 may terminate at hub center 40 or the radially outer ends of ribs 68 may terminate at rib 72. Further, the ribs 70 each extend primarily radially from an inner radius that is spaced from rib 72 to an outer radius that is spaced from the inner side of tire engaging portion 64. In other embodiments, the radially inner ends of ribs 70 may terminate at rib 72 or the radially outer ends of ribs 70 may terminate at the radially inner side of tire engaging portion 64.

According to one embodiment, disc panel 60 is molded as a single panel that includes a circumferential wall that provides a tire bed or other wheel outer perimeter surface, a first circumferential outer lip 82, a second circumferential outer lip 84, side panel 66, hub center 62 extending axially inward, hub flange 64, and molded-in ribs 60, 70, 72.

Disc panel 60 and a second disc panel (e.g., disc panel 34 of FIG. 3) can be bonded together after molding, such as by gluing or bonding with another agent. To this end, disc panels 60 and the second disc panel may be formed with bonding surfaces so that they can be bonded together. For example, the inner side portion of disc panel 60 proximate to the radially outer edge can provide a circumferential bonding surface 74 to which the opposite disc panel can be bonded. As another example, the surface of hub flange 64 that faces the opposite panel can provide a large bonding surface to which the opposite panel can be bonded. Further, ribs 68, 70, 72 may comprise surfaces 76, 78, 80, respectively, that face second inner surface of the opposite panel and can be used as bonding surfaces to which the inner surface of the opposite panel can be bonded. Ribs may also be molded in the opposite panel. Such ribs may have a bonding surface to which inner surface 67 can be bonded. As another example, the radially outer surface of a hub index (e.g., hub index 42) may be bonded to a radially inner surface of hub center 62. In addition or in the alternative, disc panel 60 and an opposite disc panel may be coupled together using other mechanisms, such as with fasteners.

In some embodiments, various portions of panel 60 may be formed separately and then assembled. By way of example, but not limitation, ribs 68, 70, 72 may be molded separately from disc panel 60 and the second disc panel and then bonded to disc panel 60 or the second disc panel before disc panel 60 and the second disc panel are bonded together.

Figure 5:
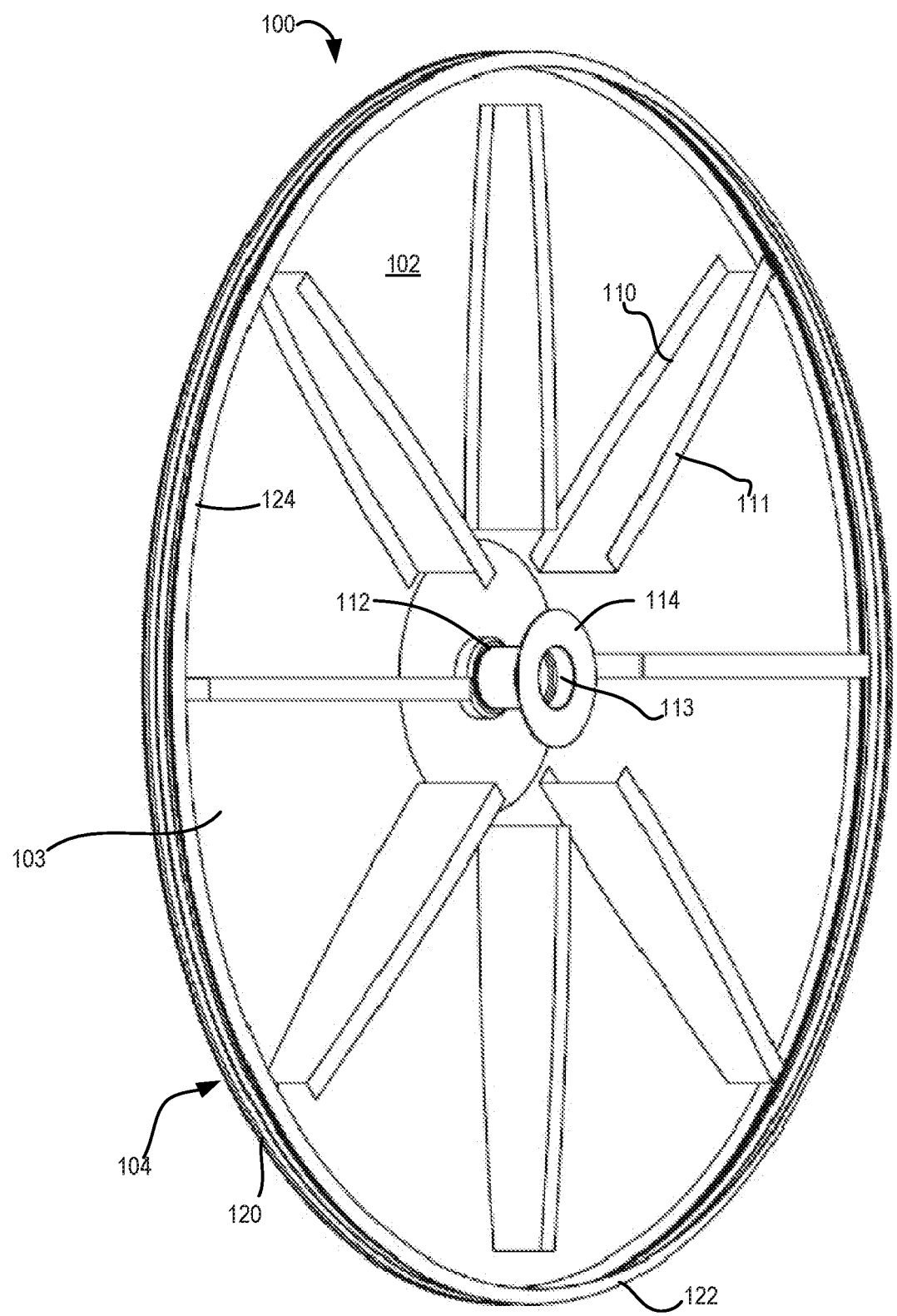
FIG. 5 is a perspective view of another embodiment of a ribbed disc panel.

FIG. 5 depicts another embodiment of an inner side of a disc panel 100. Disc panel 100 can be coupled to a second disc panel, such as second disc panel 34 or other disc panel, to form a wheel. Disc panel 100 includes a disc side panel 102 having a side outer surface and inner surface 103. The side outer surface may be similar to outer surface 16 discussed above and extend from an outer perimeter to a central opening (e.g., hub opening 113). Inner surface 103 extends between a hub portion and tire engaging portion 104. The side outer surface and inner surface 103 of disc panel 100 can have a variety of shapes, such as planer, concave, convex or other shape.

Disc panel 100 further comprises a hub center 112 and disc hub flange 114. A hub opening 113 through hub center 112 can be shaped to receive a hub. The portion of hub center 112 distal from side panel 102 may be shaped to receive a hub index (e.g., hub index 42) and act as a hub index receiving area. During assembly, the hub index can slip inside of hub center 112 to help ensure that the disc panels being assembled into a wheel are concentric to the wheel center. In addition or in the alternative, disc panel 100 and the opposite disc panel may include other alignment features to facilitate alignment of the disc panels.

A set of ribs 110 extend axially inward from inner surface 103 a sufficient distance so that ribs 110 can be bonded to an inner surface of a facing panel (e.g., panel 35 of FIG. 3). A first side of each rib 110 may follow the contour of inner surface 103 and a second side of each rib 110 may be shaped to follow the contour of the inner surface of an opposite panel (e.g., the inner surface of panel 35 of FIG. 3) where the ribs are to bond to the opposite panel. The ribs 110 are configured to provide structural support to a wheel both laterally (axially) and in compression (radially).

In the embodiment of FIG. 5, the ribs 110 each extend primarily radially from an inner radius that is spaced from hub center 112 to an outer radius that is spaced from the radially inner side of tire engaging portion 104. In other embodiments, the radially inner ends of ribs 110 may terminate at hub center 112 or, as illustrated in FIG. 3, the radially outer ends of ribs 110 may terminate at the radially inner side of the tire engaging portion 104.

According to one embodiment, disc panel 100 is molded as a single disc panel that includes a tire bed or other wheel outer perimeter surface, a first circumferential outer lip 120, a second circumferential outer lip 122, side panel 102, hub center 112, hub flange 114, and molded-in ribs 110.

Disc panel 100 and a second disc panel (e.g., disc panel 34 of FIG. 3) can be bonded together after molding, such as by gluing or bonding with another agent. To this end, disc panel 100 and the second disc panel may be formed with bonding surfaces so that they can be bonded together. For example, the inner side portion of disc panel 100 proximate to the radially outer edge can provide a circumferential bonding surface 124 to which the opposite disc panel can be bonded. As another example, the surface of hub flange 114 that faces the opposite panel can provide a large bonding surface to which the opposite panel can be bonded. Further, ribs 110 may comprise surfaces 111 that face an inner surface of the opposite panel and can be used as bonding surfaces to which the other panel can be bonded. If ribs are molded in the opposite panel, such ribs may have a bonding surface to which inner surface 103 can be bonded. As another example, the radially outer surface of a hub index (e.g., hub index 42) may be bonded to a radially inner surface of hub center 112. In addition or in the alternative, disc panel 100 and a second disc panel may be coupled together using other mechanisms, such as fasteners.

In some embodiments, various portions of disc panel 100 may be formed separately and then assembled together. By way of example, but not limitation, ribs 110 may be molded separately from disc panel 100 or the second disc panel and then bonded to disc panel 100 or the second disc panel before the disc panels are bonded together.

Figure 6:
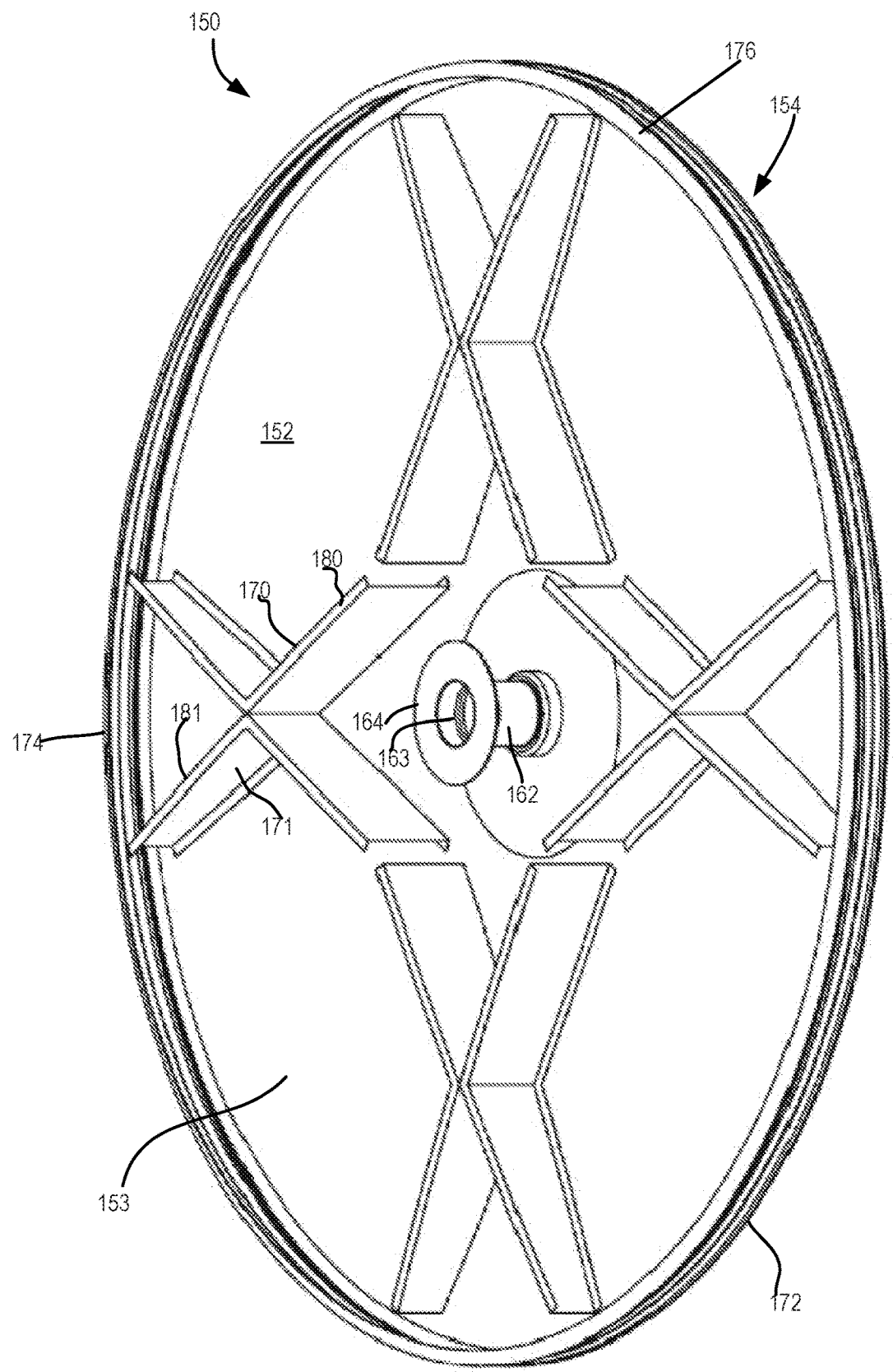
FIG. 6 is a perspective view of another embodiment of a ribbed disc panel.

FIG. 6 depicts another embodiment of an inner side of a disc panel 150. Disc panel 150 is another example of a first disc panel that can be joined to the second disc panel, such as second disc panel 34 or other disc panel, to form a wheel. Disc panel 150 includes a disc side panel 152 having a side outer surface and inner surface 153. The side outer surface may be similar to outer surface 16 discussed above and may extend from an outer perimeter of disc panel 150 to a central opening (e.g., hub opening 163). Inner surface 153 may extend between a hub portion and tire engaging portion 154. The outer surface and inner surface 153 of panel 152 can have a variety of shapes, such as planer, concave, convex or other shape.

Disc panel 150 may further comprise a hub center 162 and disc hub flange 164. A hub opening 163 through hub center 162 is shaped to receive a hub. The portion of hub center 162 distal from side panel 152 may be shaped to receive a hub index (e.g., hub index 42) and act as a hub index receiving area. During assembly, the hub index can slip inside of hub center 162 to help ensure that the disc panels being assembled into a wheel are concentric to the wheel center. In addition or in the alternative, disc panel 150 and the opposite disc panel may include other alignment features to facilitate alignment of the disc panels.

A set of right angled ribs 170, 171 extend axially inward from inner surface 153 a sufficient distance so that ribs 170, 171 can be bonded to an inner surface of a facing panel (e.g., panel 34). In the embodiment of FIG. 6, the ribs 170 and 171 are placed to form a set of "X" patterns. A first side of each rib 170, 171 may follow the contour of inner surface 153 and a second side of each rib 170, 171 may be shaped to follow the contour of the inner surface of an opposite panel (e.g., panel 35 of FIG. 3) where the ribs are to bond to the opposite panel. The ribs 170, 171 are configured to provide structural support to a wheel both laterally (axially) and in compression (radially).

According to one embodiment, disc panel 150 is molded as a single panel that includes a tire bed or other wheel outer perimeter surface, a first circumferential outer lip 172, a second circumferential outer lip 174, side panel 152, hub center 162, hub flange 164 extending radially outward from hub center 162, and molded-in ribs 170, 171.

Disc panel 150 and a second disc panel (e.g., disc panel 34 of FIG. 3) can be bonded together after molding, such as by gluing or bonding with another agent. To this end, disc panel 150 and the second disc panel may be formed with bonding surfaces so that they can be bonded together. For example, the inner side portion of disc panel 150 proximate to the radially outer edge can provide a circumferential bonding surface 176 to which the opposite disc panel can be bonded. As another example, the surface of hub flange 164 that faces the opposite panel can provide a large bonding surface to which the opposite panel can be bonded. Further, ribs 170, 171 may comprise surfaces 180, 181 that face an inner surface of the opposite panel and can be used as bonding surfaces to which the other panel can be bonded. If ribs are molded in the opposite panel, such ribs may have a bonding surface to which inner surface 153 can be bonded. As another example, the radially outer surface of a hub index (e.g., hub index 42) may be bonded to a radially inner surface of hub center 162. In addition or in the alternative, panel 150 and an opposite disc panel may be coupled together using other mechanisms, such as fasteners.

In some embodiments, various portions of disc panel 150 may be formed separately and then then assembled together. By way of example, but not limitation, ribs 110 may be molded separately from disc panel 100 or the second disc panel and then bonded to disc panel 100 or the second disc panel before the disc panels are bonded together.

Figure 8:
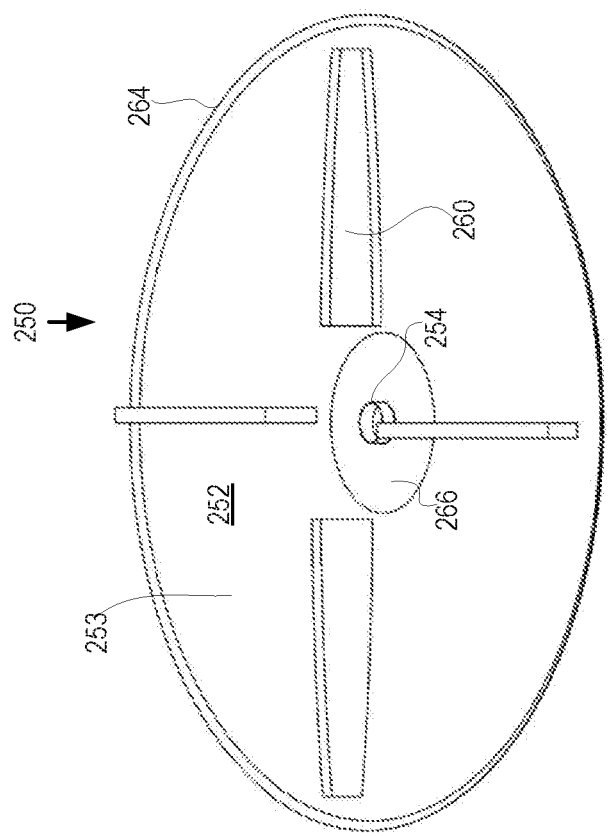
FIG. 8 is a perspective view of another embodiment of a ribbed disc panel.
Figure 7:
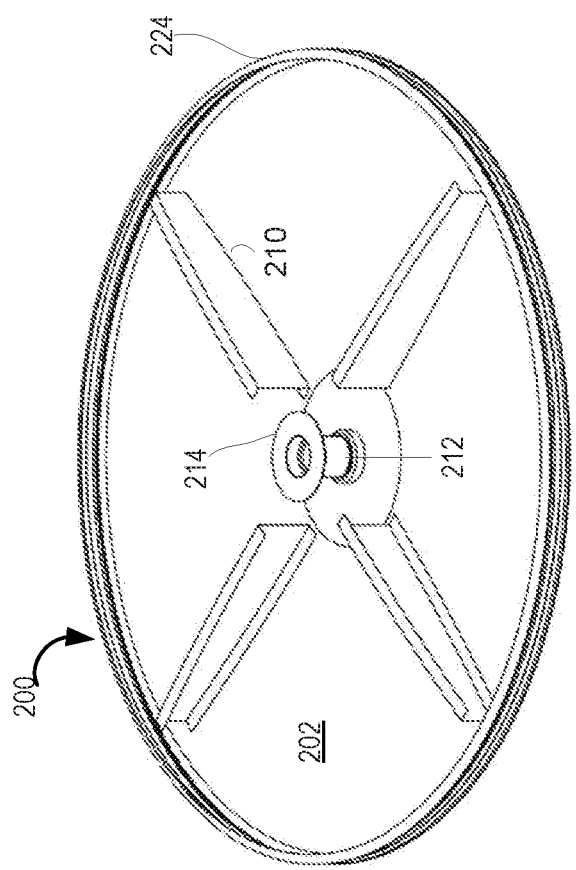
FIG. 7 is a perspective view of another embodiment of a ribbed disc panel.

FIG. 7 and FIG. 8 illustrate, respectively, another embodiment of a first disc panel 200 and a second disc panel 250 that can be assembled into a disc wheel. Disc panel 200 is similar to disc panel 100 but has fewer ribs 210. Disc panel 250 is similar to disc panel 34, but includes ribs 260. Ribs 210 and ribs 250 are spaced so that, when first disc panel 200 and second disc panel 250 are assembled, ribs 210 and ribs 260 are positioned between each other.

Disc panel 250 includes a disc side panel 252 having an outer surface and inner surface 253. The side outer surface may be similar to outer surface 18 discussed above. The side outer surface may extend radially from a radially outer perimeter of disc panel 250 to a central opening (e.g., a hub opening). The side outer surface and inner surface 253 of panel 252 can have a variety of shapes, such as planer, concave, convex or other shape. A hub index 254 projects axially inward from side panel 252 and forms a portion of a hub opening that is shaped to receive a hub. During assembly, the hub index 254 can slip inside of a hub center (e.g., hub center 212 of FIG. 7) to help ensure that the disc panels being assembled into a wheel are concentric to the wheel center. In addition or in the alternative, disc panels 200 and 250 may include other alignment features to facilitate alignment of the disc panels.

A set of ribs 260 extend axially inward from inner surface 253 a sufficient distance so that ribs 260 can be bonded to an inner surface of a facing panel (e.g., the inner surface of side panel 202 of disc panel 200). A first side of each rib 260 may follow the contour of inner surface 253 and a second side of each rib 260 may be shaped to follow the contour of the inner surface of an opposite panel 202 where the ribs are to bond to the opposite panel. The ribs 260 are configured to provide structural support to a wheel both laterally (axially) and in compression (radially).

In the embodiment of FIG. 8, the ribs 260 each extend primarily radially from an inner radius that is spaced from hub index 254 to an outer radius that is spaced from the radially outer edge of disc panel 250. In other embodiments, the radially inner ends of ribs 260 may terminate at hub index 254 or the radially outer ends of ribs 260 may terminate at another position.

According to one embodiment, disc panel 250 is molded as a single panel that includes side panel 252, hub index 254 and molded-in ribs 260. Disc panel 250 and disc panel 200 can be bonded together after molding, such as by gluing or bonding with another agent. To this end, disc panel 200 and disc panel 250 may be formed with bonding surfaces so that they can be bonded together. For example, the inner side portion of disc panel 200 proximate to the radially outer edge can provide a circumferential bonding surface 224 to which circumferential bonding surface 264 on the inner side of disc panel 250 can be bonded. As another example, the surface of hub flange 214 that faces panel 252 provides a large bonding surface to which a bonding surface 266 of panel 260 can be bonded. Further, ribs 210 may comprise surfaces 211 to which the inner surface 253 of panel 252 can be bonded. Similarly ribs 260 may include bonding surfaces 262 to which the inner surface of panel 202 can be bonded. As another example, the radially outer surface of a hub index 254 may be bonded to a radially inner surface of hub center 212. In addition or in the alternative, disc panels 200 and 250 may be coupled together using other mechanisms, such as with fasteners.

In some embodiments various portions of disc panels 200 and 250 may be formed separately and then assembled together. By way of example, but not limitation, ribs 210, 260 may be molded separately from disc panels 200, 250 and then bonded to disc panel 200 or disc panel 250 prior to assembly of the disc panels into a wheel.

Disc panels and wheels with internal ribs, such as disc panels and wheels described above, can be formed of composite materials, such as fiber reinforced polymers. By way of example, but not limitation, disc panels and wheels with internal ribs may be formed from fiberglass composite material or carbon fiber composite material. Internal cross-ribs, that is ribs that extend laterally from side panel to side panel, allow the panels to be lighter while retaining stiffness and strength. Accordingly, an all composite material disc wheel, such as an all carbon fiber disc wheel, with relatively thin walls can be formed without requiring a structural core material, such as a honeycomb material. In other embodiments, a disc wheel with internal ribs or other internal braces may include a structural core material.

According to one embodiment, ribs or other braces can be molded into a part by use of a "trapped rubber" process. For example, the ribs can be molded into a disc panel using shaped pieces of silicone or other flexible, expanding rubber or other material to position and support braces during the molding process. The material for the shaped pieces can be selected to withstand the molding temperatures and pressures, while remaining flexible enough so that the shaped pieces can be removed after molding. One embodiment of a "trapped rubber" molding process is discussed below.

Figure 9:
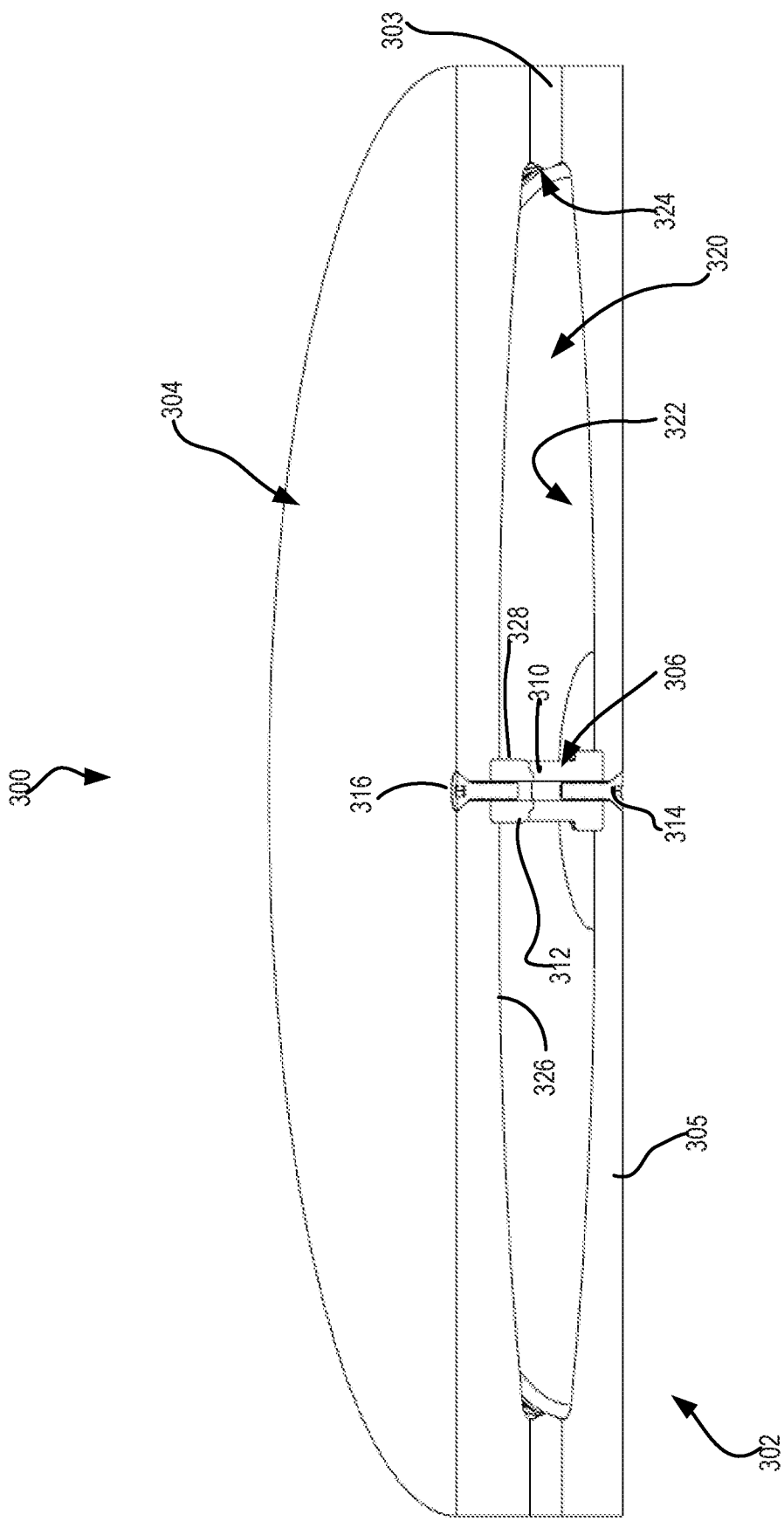
FIG. 9 is a sectional view of one embodiment of a mold for molding a disc panel.
Figure 10:
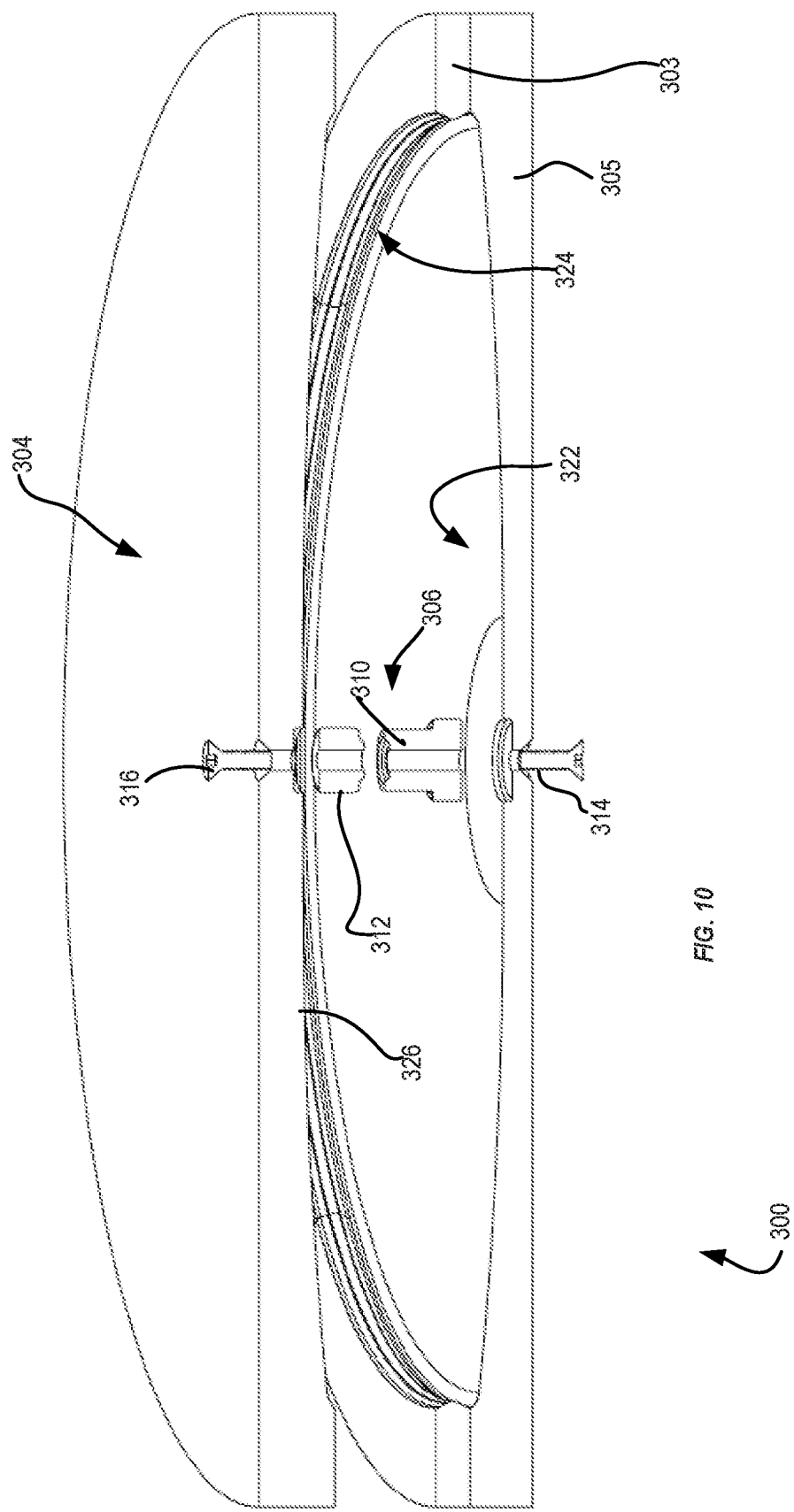
FIG. 10 is a sectional view of one embodiment of a mold for molding a disc panel.
Figure 11:
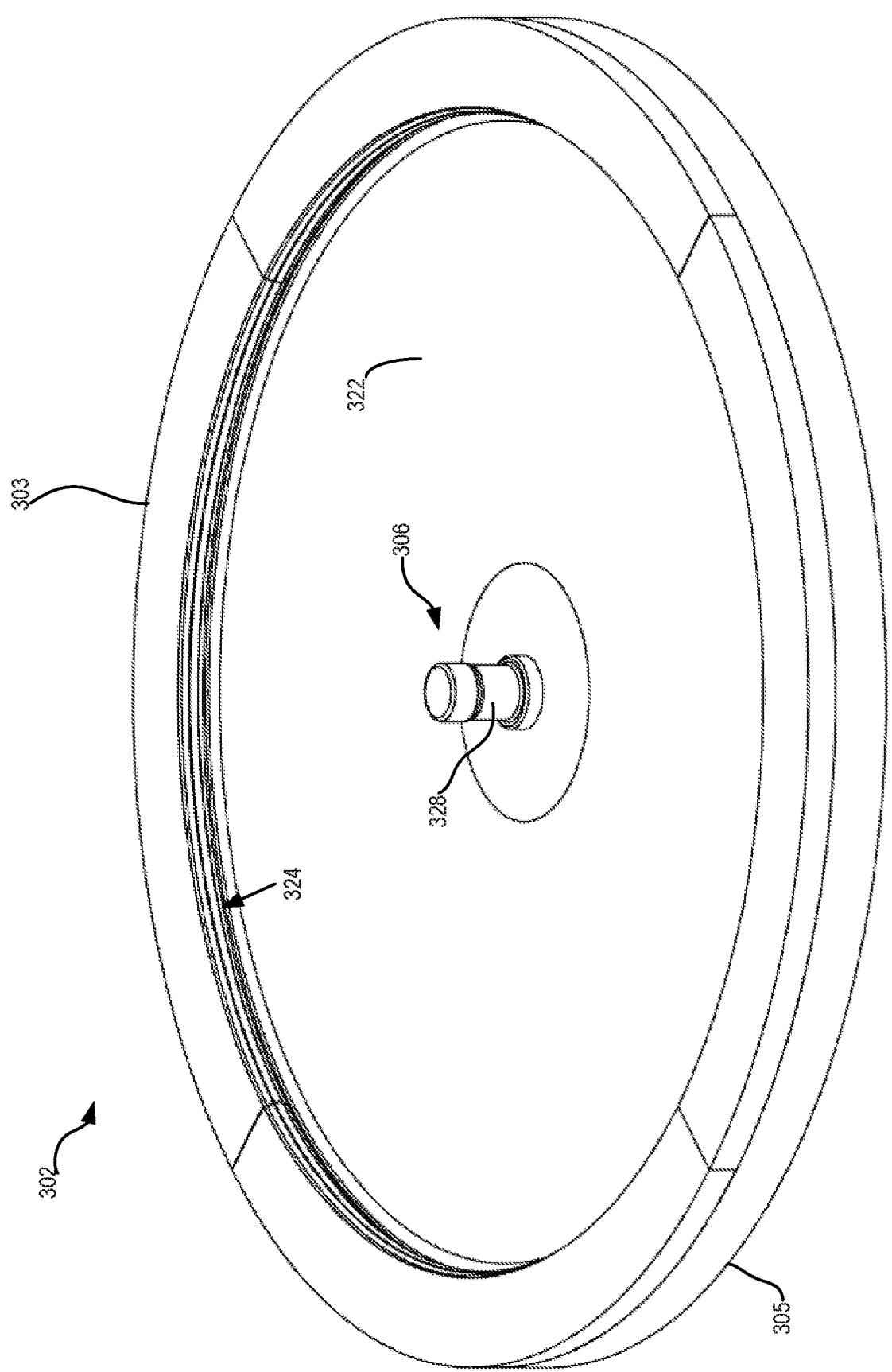
FIG. 11 is a perspective view of one embodiment of a mold portion.

FIG. 9 is a sectional view of one embodiment of a mold 300 for molding a disc panel. FIG. 10 is a partially exploded view of mold 300. FIG. 11 illustrates one embodiment of a portion of mold 300. Mold 300 comprises a plurality of mold pieces that form a mold cavity 320 shaped to mold a disc panel. Mold 300 may be formed from any number of pieces. The pieces may be made of a variety of materials, such as aluminum or other materials, capable of withstanding the temperatures and pressures used in the molding processes.

In the embodiment illustrated, mold 300 comprises a mold portion 302, a mold portion 304 and a center pin 306. Mold portion 302, mold portion 304 or center pin may be formed of one or more parts. In the embodiment illustrated, for example, mold portion 302 includes mold piece 305 and mold pieces 303. Center pin 306 comprises first portion 310 and second portion 312. Center pin first portion 310 can be coupled to mold piece 305 with fastener 314 and center pin second portion 312 can be coupled to mold piece 304 with fastener 316.

Mold portion 302 and center pin 306 provide molding surface to shape a hub portion, side panel and tire engaging portion of a disc panel. Mold portion 304 provides a molding surface to shape the bonding surfaces of the disc panel to match the inner side of the opposite disc panel. Mold portion 302 and mold portion 304 can be pressed together under heat to cure a composite material into a disc panel having molded-in ribs.

More particularly, the inner surface 322 of mold piece 305 provides a molding surface to create the outer shape of a side panel. Surface 322 may be concave, convex, planer or have another shape to achieve a desired side panel outer surface shape. Inside surface 324 at the radially outer periphery of mold cavity 320 provides a molding surface to shape a tire bed (e.g., tire bed 24) or other wheel circumferential perimeter wall. The radially outer surface 328 of pin 306 provides a molding surface that defines the shape of the hub opening through a hub center. The inside surface 326 of mold portion 304 may be convex, concave, planer or have another shape. According to one embodiment, insider surface 326 is shaped like the inside surface of an opposite panel. For example, if mold 300 is shaped to a mold disc panel that will be bonded to a disc panel 34 (FIG. 3), then inside surface 326 may be shaped like inside surface 38 of panel 34.

Figure 12:
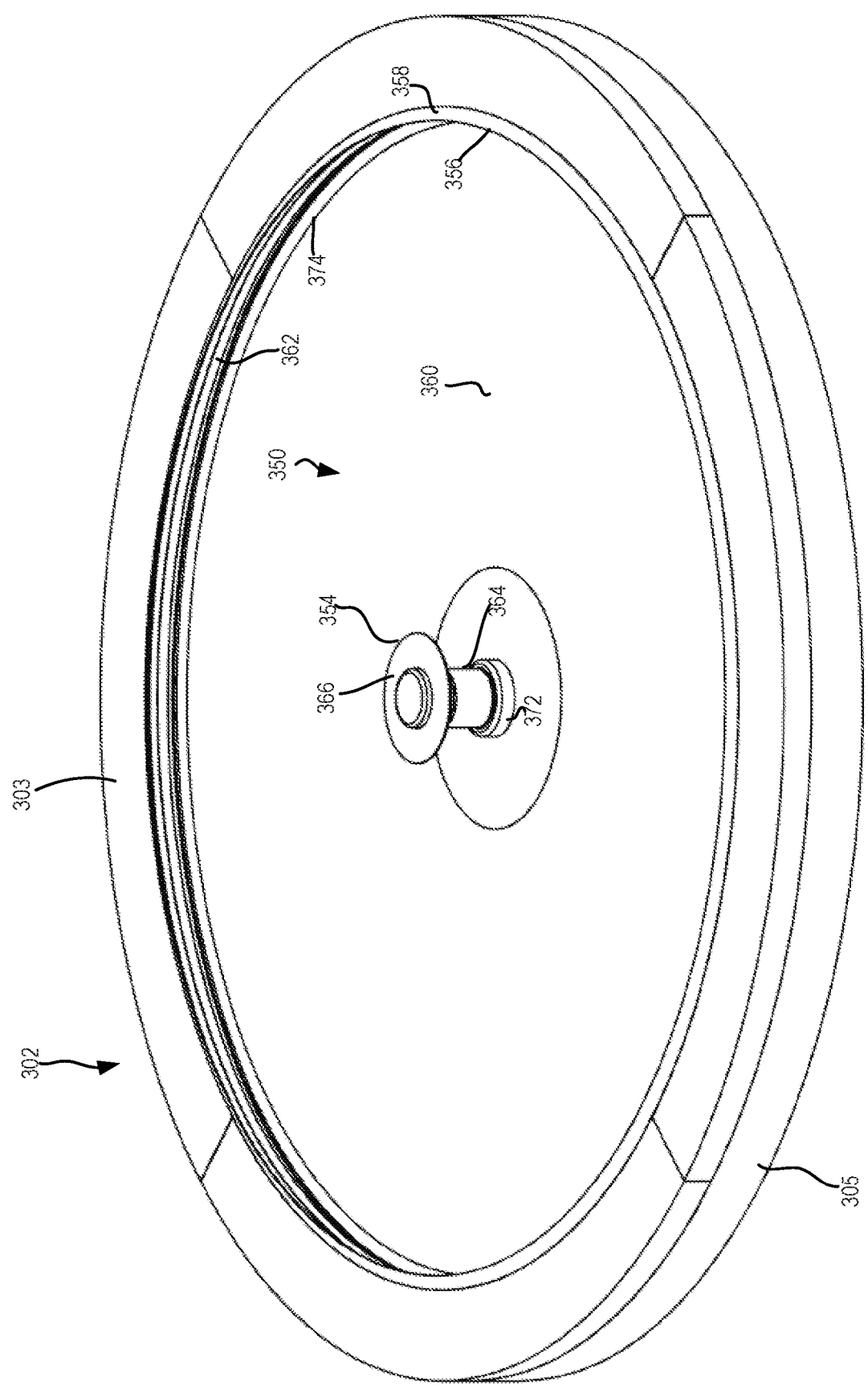
FIG. 12 is a perspective view of one embodiment of a mold portion with panel material positioned therein.

As illustrated in FIG. 11, mold portion 302 and center pin 306 can be assembled to provide a mold area with molding surfaces 322, 324, 328. For example, center pin portion 310 can be coupled to mold piece 305 with fastener 314 and center pin portion 312 placed on center pin portion 310. Carbon fiber composite material can be placed on the molding surfaces. For example, as illustrated in FIG. 12, composite panel material 350, such as carbon fiber composite material or other composite material, extends from edge 354 to edge 364 can be positioned over molding surfaces 322, 324, 328. Carbon fiber panel material 350 includes material to form side panel 360, tire bed 362, hub center portion 364, hub flange 366, and an extension 358. Extension 358 can provide a circumferential bonding surface when panel material 350 has fully cured into a disc panel.

The panel material 350 may comprise, for example, one or more layers of pre-impregnated composite materials (e.g., one or more layers of pre-preg carbon fiber composite material). According to one embodiment, a center cut sheet of composite material, such as carbon fiber composite material, is positioned on surface 322 to form a side panel 360 that extends from inner radius 372 to outer radius 374. Additional layers of composite material can be positioned over the molding surfaces to extend panel material 350 from radius 374 to edge 356 and from radius 372 to edge 354.

At this point, the panel material 350 could be fully cured into a disc panel without molded-in ribs. For example, panel material can be cured into a disc panel similar to disc panels 32, 60, 100, 150 or 200, but without the respective ribs. Separately molded ribs can then be bonded to the inner surface of the disc panel to form a disc panel 32, 60, 100, 150, 200 or other disc panel.

In another embodiment, internal ribs are molded in. For example, ribs formed of a composite material can be arranged on the inner surface of side panel 360. With the ribs in place, panel material 350 and the ribs can then be baked under pressure and temperature to mold a disc panel with internal ribs.

In one embodiment, the ribs are wrapped on shaped rib support pieces formed from silicone or other similar flexible, expanding material that can withstand the temperatures and pressures of the molding process. The material used for the rib support pieces may also be selected so that the ribs do not bond to the rib support pieces during curing. The shaped rib support pieces with the ribs wrapped thereon can be placed on the inside surface of side panel 350 prior to baking. The rib support pieces support the ribs and maintain the ribs in desired positions as the panel is backed. Furthermore, the rib support pieces may expand during the backing process to assert additional pressure on the ribs and panel material. The ribs bond to the inside surface of panel 360 during baking as the ribs cure and thus become molded into the panel. The rib support pieces can then be removed after the disc panel has cured.

The shape, placement and wrapping of the rib support pieces can be selected to control the resulting internal rib pattern. The rib support pieces can be shaped, positioned and wrapped to form, for example, ribs 46, 68, 70, 72, 110, 170, 171, 210 or other ribs or braces that extend axially inward from the inner surface of a side panel.

Figure 13:
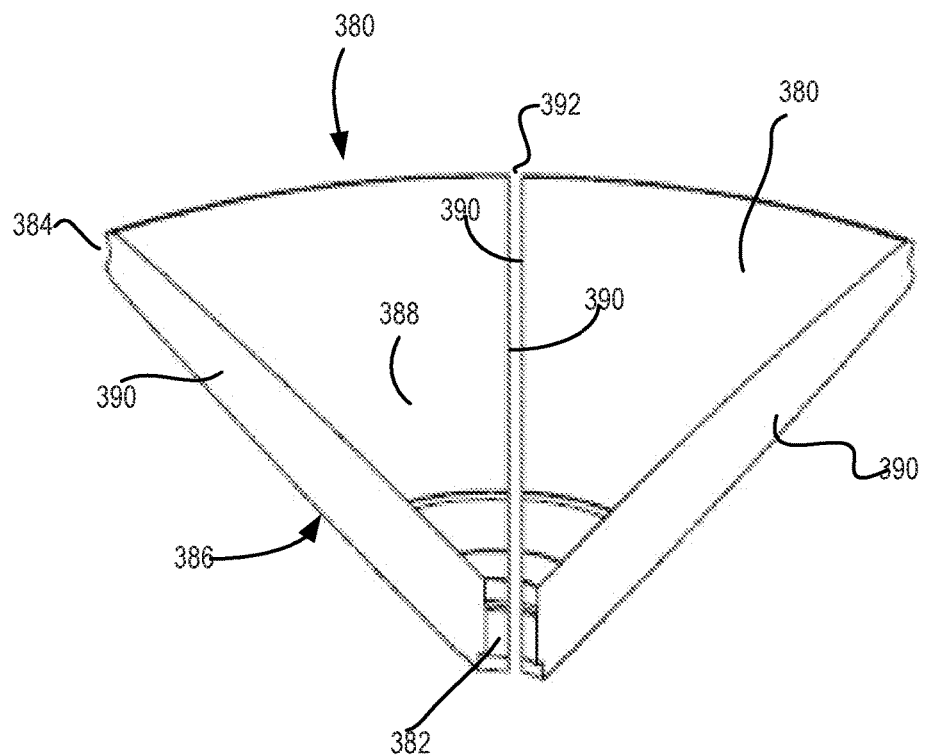
FIG. 13 is a perspective view of one embodiment of shaped pieces of material used to support ribs during molding.

FIG. 13 illustrates one embodiment of shaped rib support pieces 380. In the illustrated embodiment, each rib support piece 380 is a "pie piece" shape and has a radially inner end 382 generally shaped to conform to molding surface 328 of center pin 306, a radially outer end having a surface generally shaped to conform to molding surface 324, a surface 386 that will face molding surface 322 during molding, a surface 388 that will faces mold portion 304 during molding and surfaces 390 that extend between inner end 382, outer end 384 and surfaces 324, 326. The surfaces of a rib support piece 380, such as changes in height or other features. Shaped rib support pieces 380 can be made of silicone or other flexible, expanding rubber or other material selected to withstand the temperatures and pressures of the molding process while remaining flexible enough so that the shaped pieces can be removed from the molded disc panel without breaking the molded part.

Figure 14:
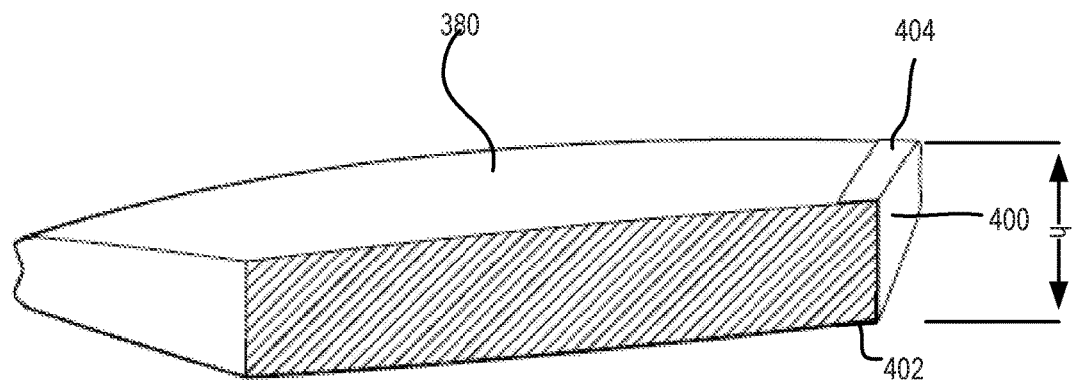
FIG. 14 is a sectional view of one embodiment of a rib wrapped on a shaped rib support.

A rib formed from a composite material, such as a pre-preg carbon fiber ply, can be wrapped on a rib support piece 380 over a surface 490. The rib can be folded over to at least partially overlap surface 386 and surface 388. The rib may also be wrapped to at least partially overlap radially inner end 382 and radially outer end 384 of the adjacent rib support piece 380. Thus, ribs may include a portion of ply that gets folded over such that it will overlap multiple surfaces of the adjacent shaped rib support piece 380. FIG. 14 illustrates one embodiment of a cross-section of a rib support piece 380 with a rib 400 wrapped over a surface 390 (FIG. 13). Rib 400 comprises a portion 402 folded over surface 386 and a portion 404 folded over surface 388. During a molding operation, portion 402 is pressed against an inner surface of a side panel (for example, the inner surface of side panel 360) such that rib 400 and side panel mold together as the composite material cures. The height "h" of the rib support piece is sufficient so that portion 404 can be shaped by molding surface 326 (FIG. 9) during the molding process.

In FIG. 14, rib 400 is wrapped on a single rib support piece 380 to form a "C" shaped rib. However, one or more layers of composite material can also be folded over an adjacent rib support piece to create an "I"-beam shaped rib.

Figure 15:
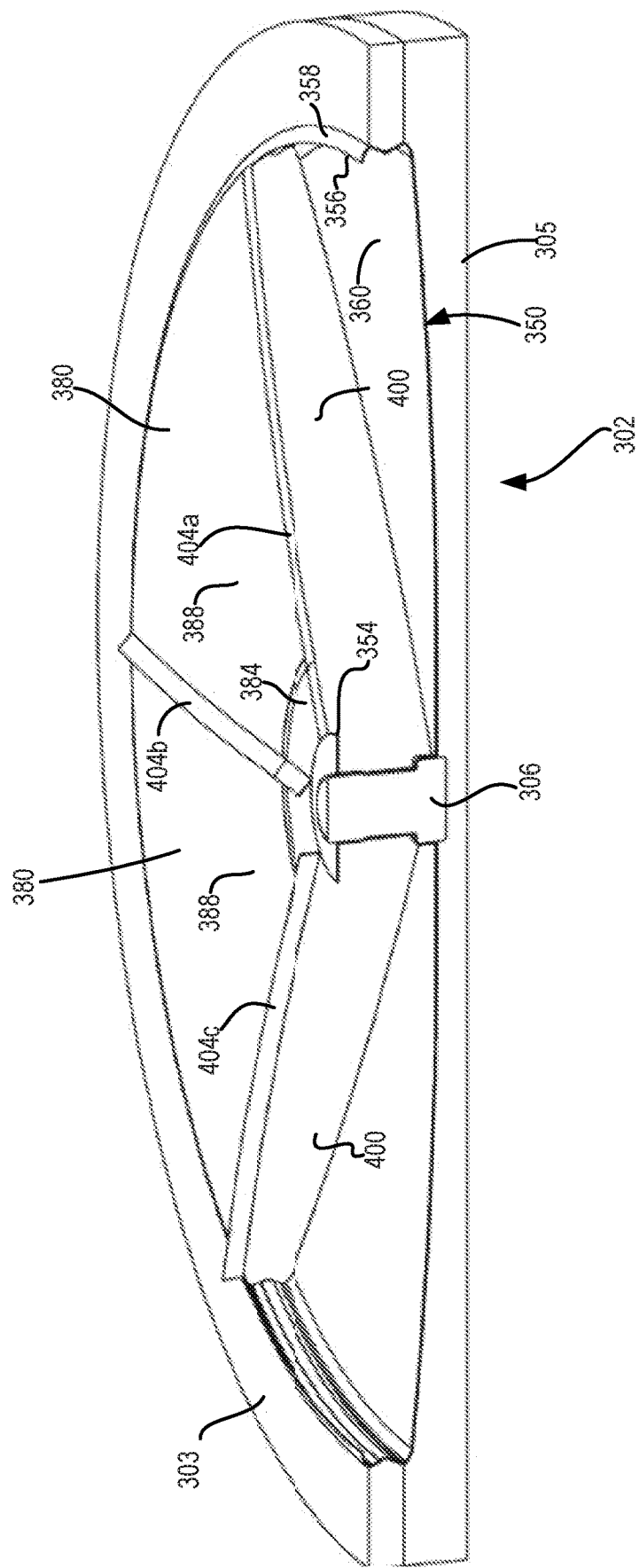
FIG. 15 is a sectional view of one embodiment of panel material, ribs and rib supports positioned in a mold area.

FIG. 15 illustrates a view of one embodiment of mold portion 302 with several rib support pieces 380 and ribs arranged on the panel material 350 that extends from edge 345 to edge 356. In this example, each rib 400 is wrapped on an adjacent rib support piece 380. Rib portions 404a, 404b and 404c may be folded over to overlap the surface 388 of the adjacent rib support piece 380 (rib portion 404a is shown fully folded over, but rib portions 404b and 404c are depicted, for the purposes of illustration, as not yet fully folded over). A rib 400 may also be folded over surface 386 of the adjacent rib support piece 380 (e.g., each rib 400 may include a portion 402 as shown in FIG. 14 that folds over the adjacent rib support piece). In some embodiments, a rib 400 may also be folded over the radially inner end 382 (FIG. 13) or radially outer end 384 (FIG. 13) of the rib support piece 380.

During curing, the portion of a rib 400 that is folded over rib support piece surface 386 (e.g., portion 402 of FIG. 14) will bond to the inner surface of side panel 360 while the portion of the rib that is folded over rib support piece surface 388 (e.g., rib portions 404a, 404b, 404c) will be shaped to provide bonding surfaces that match the contour of the inside surface of an opposite panel. Similarly, if a portion of a rib 400 is folded over inner end 382, that portion will bond to the hub center and, if a portion of the rib 400, is folded over the radially outer end 384, that portion will bond to the radially inner surface of the tire engaging portion.

Figure 16:
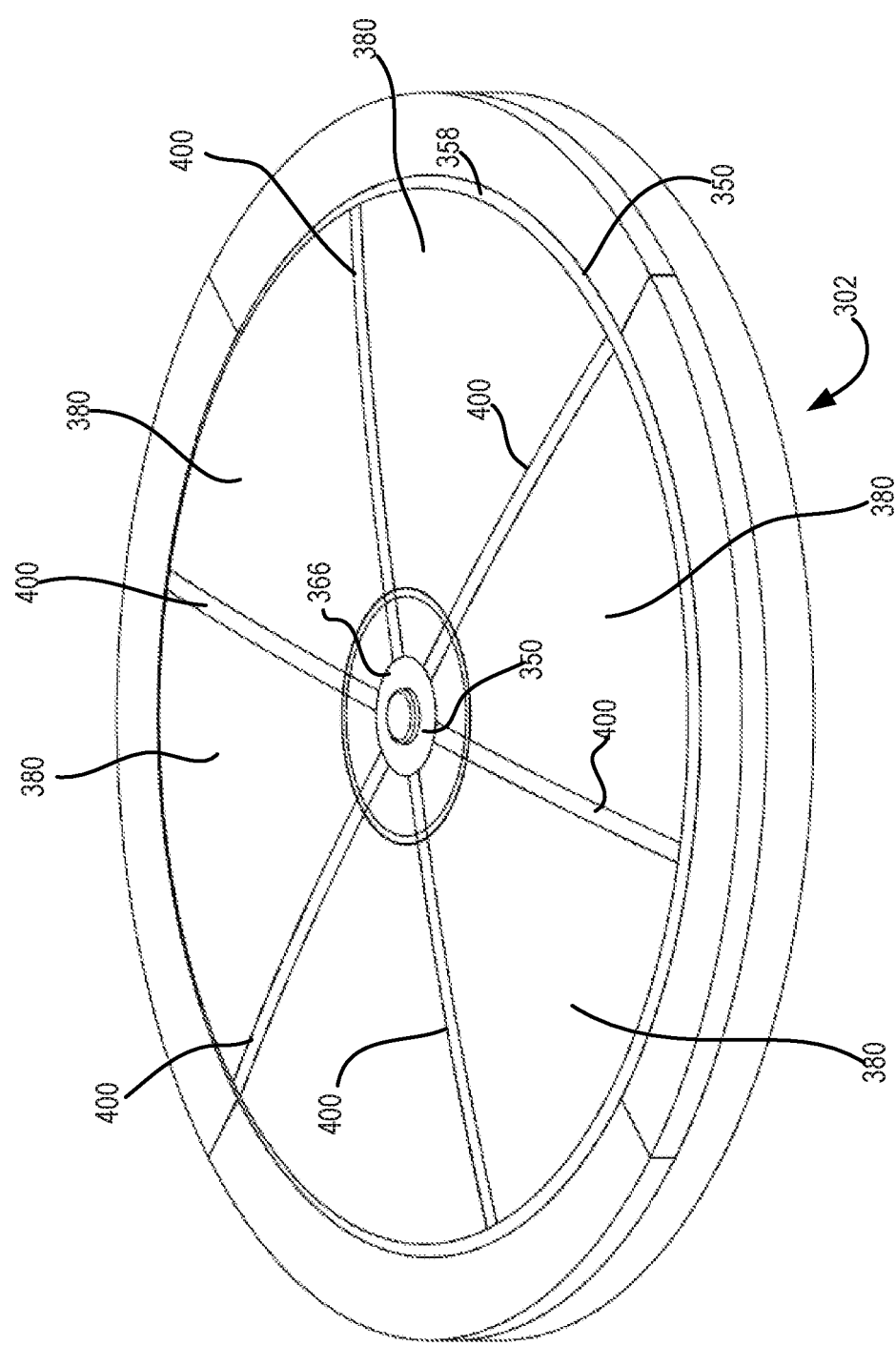
FIG. 16 is a perspective view of one embodiment of panel material, ribs and shaped rib supports positioned in a mold area.

FIG. 16 is a perspective view of one embodiment of mold portion 302 with rib support pieces 380 and ribs 400 arranged on panel material 350 (in FIG. 15, only hub flange 366 and extension 358 of panel material 350 are visible). With the rib support pieces 380 and ribs 400 in place as shown in FIG. 15, the mold portion 304 can be lowered on to complete mold 300. Fastener 316 may be used to further secure center pin 306 (see FIG. 10). Mold 300 is placed in a press and heat and pressure applied to cure panel material 350 and ribs 400. In some embodiments, the baking process can occur at over 100 psi. In any case, the cooking process can occur as appropriate for the resin system being used. As one of ordinary skill in the art will appreciate, resin systems may be flexible in their cure cycles. For example, using a particular resin system, a manufacturer can cure a part at 230 F for 1 hour or at 280 F in 3 minutes using the same resin. The process may be relatively slow (temperature reduced, time increased) to allow the silicone to expand but to prevent the silicone (or other material) from expanding and breaking the molds. The temperature/time selection can depend at least in part on the robustness of the molds. In some embodiments, the mold may be robust enough that the expansion of higher temperatures could be contained without breaking the mold such that higher temperatures/shorter times can be used.

Shaped pieces of expandable material, such as rib support pieces 380, facilitate bonding and shaping of composite material by expanding to put axial, radial and circumferential (perpendicular to axial and radial) pressure on the composite material. For example, rib support pieces 380 can expand axially to press flange 366 and extension 358 against molding surface 326 and press side panel 360 against molding surface 322. Moreover, axial expansion can cause a shaped piece 380 to press a rib portion 402 against panel material 350 and press a rib portion 404 against molding surface 326. Shaped pieces can also expand radially to press tire bed 362 against molding surface 324 and center portion 364 against molding surface 328. If a rib 400 is folded over radially inner end 382, radial expansion of support piece 380 can cause the rib support piece 380 to press that portion of the rib 400 against the outer surface of hub center portion 364. Similarly, if a rib 400 is folded over radially outer end 384, radial expansion of a support piece 380 can cause the support piece 380 to press that portion of the rib against the radially inner surface of tire bed 362. A rib support piece 380 can expand circumferentially to put pressure on the portions of ribs 400 sandwiched between support pieces 380.

When the disc panel has finished its heat cycle, it can be removed from the heat/pressure and allowed to cool. Because the rib support pieces are flexible, they can be wriggled out from between the ribs without breaking the ribs or other portions of the molded part. The molded disc panel with molded-in internal ribs can be removed from the mold.

Using the arrangement of FIG. 15, the molded disc panel removed from the mold can be similar to disc panel 32, but with a different configuration of ribs. For example, in contrast to ribs 46 depicted in FIG. 3, the radially inner ends of ribs 400 are bonded to hub center portion 364 and the radially outer ends of ribs 400 are bonded to the radially inner side of the tire engaging portion.

A complimentary disc panel, such as disc panel 32 can also be molded, with or without ribs, using an appropriate mold shape. The separately molded disc panels can then be joined to form an all composite material disc wheel, such as an all carbon fiber disc wheel.

Figure 17:
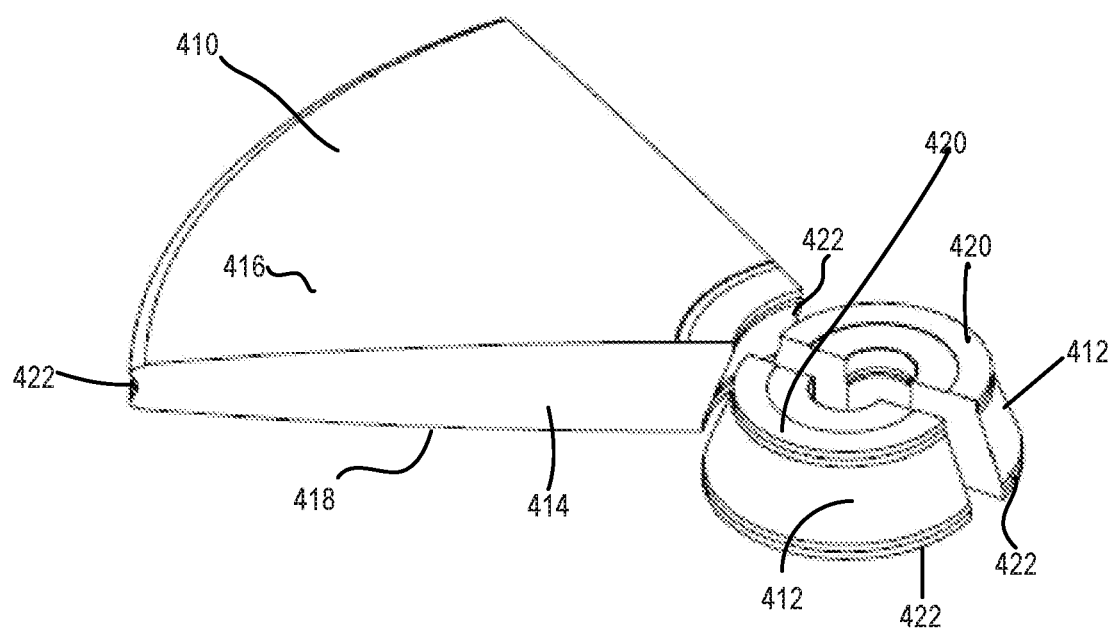
FIG. 17 is a perspective view of another embodiment of shaped pieces of material used to support ribs during molding.

FIG. 17 illustrates another example of shaped pieces that can be used to achieve a desired rib configuration. The embodiment of FIG. 17 includes rib support piece 410 and shaped spacers 412. Rib support piece 410 and spacers 412 can be made of silicone or other flexible, expanding rubber or other material selected to withstand the temperatures and pressures of the molding process while remaining flexible so that they can be removed from the molded disc panel. Although only one rib support piece 410 is illustrated, multiple rib support pieces 410 may be used in a molding process.

A rib that has not been fully cured can be wrapped over surface 414 to fold over surfaces 416 and 418, similar to as illustrated in FIG. 14 with respect to shaped piece 380. The rib may also be wrapped over the radially inner end 420 and radially outer end 422 of rib the support piece 410. This process may be repeated for multiple ribs. Spacers 412 can be placed in the mold about the portion of the panel material that forms the center hub. Rib support pieces with ribs disposed thereon may be placed in a mold. Spacers 412 achieve separation of the ribs from the center hub portion. Thus, the embodiment of FIG. 16 may be used to create, for example, the rib pattern of FIG. 3.

Figure 18:
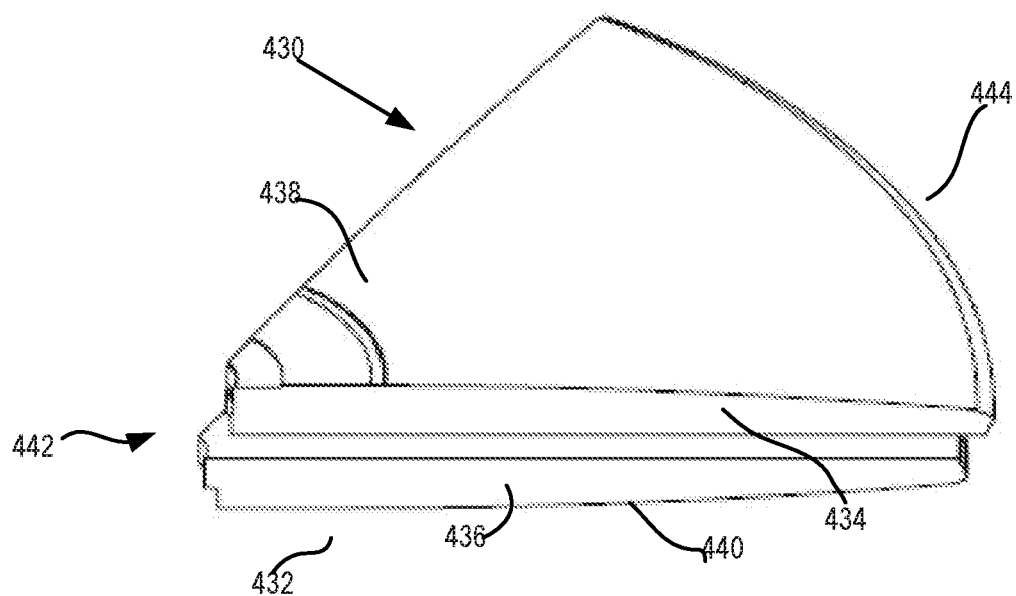
FIG. 18 is a perspective view of yet another embodiment of shaped pieces of material used to support ribs during molding

FIG. 18 illustrates another example of shaped pieces that can be used to achieve a desired rib configuration. In the embodiment of FIG. 18, shaped pieces 430 and 432 can be stacked to form a pie piece shaped rib support piece. A composite material may be positioned over surfaces 434 and 436 and folded over surfaces 338, 440 (e.g., similar to portions 402, 404 of FIG. 14). The composite material may also be folded over the radially inner end 442 or radially outer end 444. In this embodiment, composite material can also be disposed between pieces 430 and 432. In this manner, a cross-rib with a circumferentially extending portion (e.g., the portion between pieces 430 and 432) can be created.

In other embodiments, shaped pieces of material (e.g., rib support pieces or spacers) may be formed from a metal or other material that expands under the temperatures used in the molding process. A shaped piece can be formed of multiple sub-pieces assembled together with fasteners or other mechanisms so that the shaped piece can be disassembled and removed from the disc panel when the disc panel has fully cured.

Thus, as one of ordinary skill in the art will appreciate from the foregoing, shaped pieces of various materials can be shaped to achieve a variety of rib configurations, including, but not limited to those depicted in FIGS. 3-8.

Figure 19:
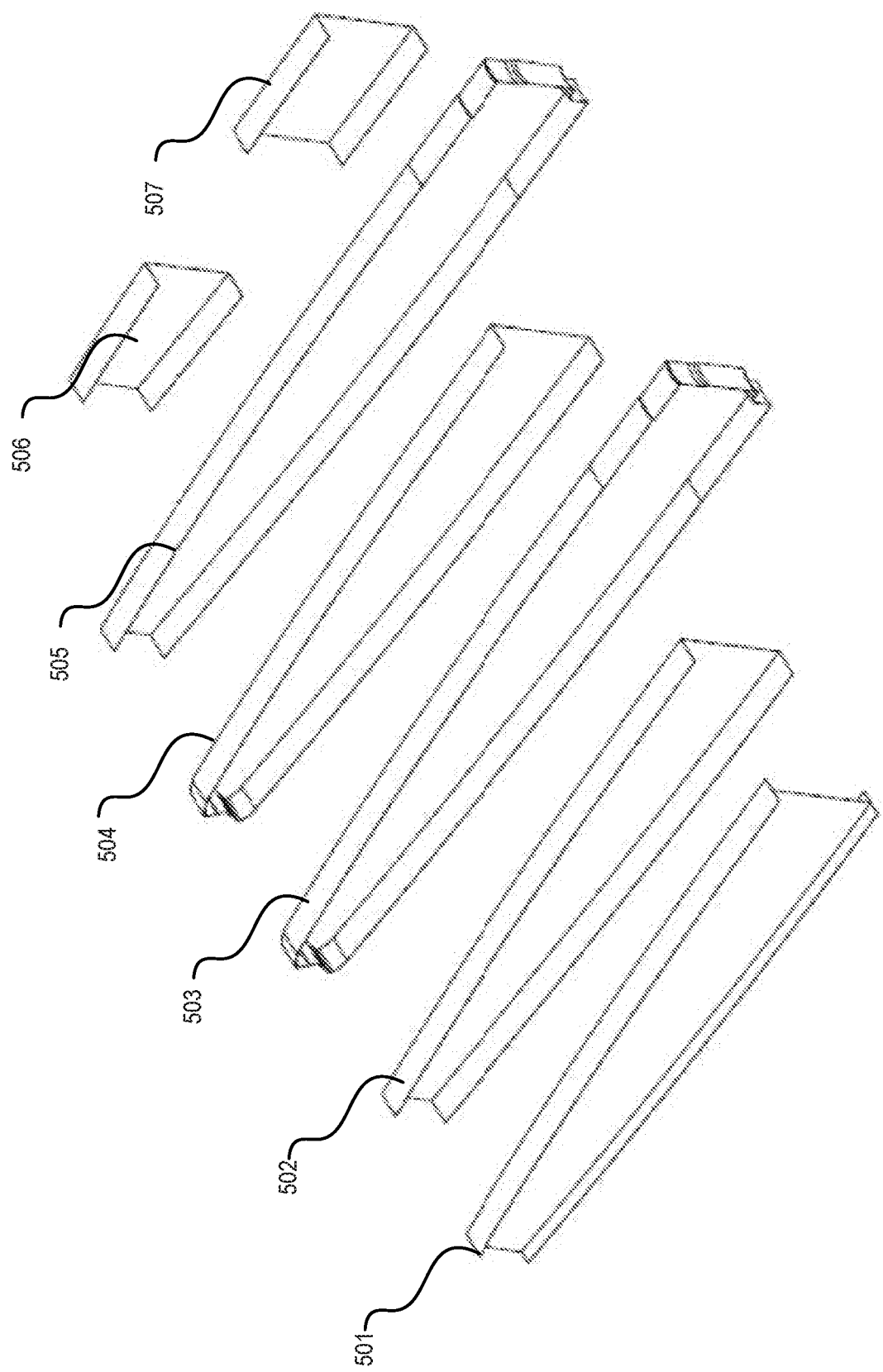
FIG. 19 depicts several embodiments of ribs.

As discussed above, disc panels can be formed with molded-in ribs. In other embodiments, the ribs can be molded separately from the disc panels and then bonded to the panels after the panels are molded. FIG. 19 illustrates several non-limiting examples of ribs 501, 502, 503, 504, 505, 506, 507 that can be molded independent of the side panels and glued in after the fact. These examples include "I" beam shaped ribs (e.g., rib 501) and "C" shaped ribs (e.g., ribs 502, 504, 505, 506, 507).

Disc wheels formed as discussed herein may be coreless in that they do not have a core formed of structural foam, a honeycomb material or other structural material in addition to the ribs between the side panels. For example, in some embodiments there is simply air between the internal components. In other embodiments, a core material may be added.

Moreover, while ribs are used as the primary example of internal braces, other braces may be used. For example, a sheet of carbon fiber composite material or other composite material can be disposed in a wave (e.g., a sine wave) with the crests of the waves contacting the inner surface of a first side panel. The wave shape can be formed in a mold using appropriate shaped pieces. The wave structure can be molded in to the first panel at the first set of wave crests. After molding, a second disc panel can be bonded to the opposite set of wave crests. The wave structure can thus provide an internal brace for a disc wheel.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

Although specific embodiments have been described, these embodiments are merely illustrative, and not restrictive of the invention. The description herein of illustrated embodiments of the invention is not intended to be exhaustive or to limit the invention to the precise forms disclosed herein. Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention. Any dimensions provided are provided by way of example and other embodiments may be sized as needed or desired.

It will also be appreciated that one or more of the elements depicted in the drawings/figures can also be implemented in a more separated or integrated manner, or even removed or rendered as inoperable in certain cases, as is useful in accordance with a particular application.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A bicycle disc wheel comprising:
   a first disc panel comprising:
      a first side outer surface, the first side outer surface radially extending from a first disc panel outer perimeter to a center opening;
      a first side inner surface;
      a circumferential perimeter wall that defines a bicycle tire seat;
      a circumferential first bonding portion;
      an internal hub center extending axially inward, the internal hub center comprising an index receiving area and a disc panel hub flange distal from the first side inner surface of the first disc panel;
   a second disc panel comprising:
      a second side outer surface, the second side outer surface radially extending from a second disc panel outer perimeter to the center opening;
      a second side inner surface, the second side inner surface axially spaced from and facing the first side inner surface;
      a hub index extending axially inward, the hub index received in the index receiving area of the internal hub center, the second disc panel bonded to the first disc panel at the disc panel hub flange and the circumferential first bonding portion; and
   a plurality of internal braces coupled to the first side inner surface and the second side inner surface that provide radial and axial structural support to the first disc panel and second disc panel.

2. The bicycle disc wheel of claim 1, wherein the plurality of internal braces comprises a plurality of ribs molded in the first disc panel.

3. The bicycle disc wheel of claim 1, wherein the plurality of internal braces comprises a plurality of ribs molded in the second disc panel.

4. The bicycle disc wheel of claim 1, wherein the plurality of internal braces comprises a radially extending rib coupled to the first side inner surface and the second side inner surface.

5. The bicycle disc wheel of claim 1, wherein the plurality of internal braces comprises a circular rib concentric to the center opening, the circular rib coupled to the first side inner surface and the second side inner surface.

6. The bicycle disc wheel of claim 1, wherein the plurality of internal braces comprises a plurality of radially extending ribs coupled to the first side inner surface and the second side inner surface, each radially extending rib in the plurality of radially extending ribs extending radially from the internal hub center to the circumferential perimeter wall.

7. The bicycle disc wheel of claim 1, wherein the plurality of internal braces comprises a radially extending rib coupled to the first side inner surface and the second side inner surface, the radially extending rib spaced from the internal hub center.

8. The bicycle disc wheel of claim 7, wherein the radially extending rib is spaced from the circumferential perimeter wall.

9. The bicycle disc wheel of claim 1, wherein the second disc panel is bonded to the first disc panel at a plurality of bonding surfaces.

10. The bicycle disc wheel of claim 9, wherein the plurality of bonding surfaces comprises bonding surfaces on the plurality of internal braces.

11. The bicycle disc wheel of claim 1, wherein the bicycle disc wheel is an all carbon fiber disc wheel.

12. The bicycle disc wheel of claim 1, wherein the bicycle disc wheel is a coreless disc wheel.

13. The bicycle disc wheel of claim 12, wherein the first side outer surface and the second side outer surface are convex and wherein the plurality of internal braces comprises a plurality of radially extending ribs.

14. The bicycle disc wheel of claim 1, wherein the plurality of internal braces comprises:
   a ring-shaped rib spaced from the internal hub center;
   a first plurality of radially extending ribs between the ring-shaped rib and the internal hub center; and
   a second plurality of radially extending ribs between the ring-shaped rib and the circumferential perimeter wall.

15. The bicycle disc wheel of claim 14, wherein the first plurality of radially extending ribs are spaced from the ring-shaped rib and the internal hub center and wherein the second plurality of radially extending ribs are spaced from the ring-shaped rib and the circumferential perimeter wall.

16. The bicycle disc wheel of claim 1, wherein the internal hub center comprises a radially inner surface, wherein the hub index comprises a radially outer surface, and wherein the radially outer surface of the hub index is bonded to the radially inner surface of the internal hub center.

17. The bicycle disc wheel of claim 1, wherein the plurality of internal braces comprises a plurality of radially extending ribs coupled to the first side inner surface and the second side inner surface, wherein each radially extending rib in the plurality of radially extending ribs is separated from each adjacent radially extending ribs from the plurality of radially extending ribs by an air gap.

18. The bicycle disc wheel of claim 1, wherein the plurality of internal braces comprises a plurality of radially extending ribs coupled to the first side inner surface and the second side inner surface, wherein each radially extending rib in the plurality of radially extending ribs is spaced from the internal hub center and the circumferential perimeter wall.

19. The bicycle disc wheel of claim 18, wherein each radially extending rib in the plurality of radially extending ribs is separated from each adjacent radially extending rib from the plurality of radially extending ribs by an air gap.

* * * * *